US008856941B2

(12) United States Patent  (10) Patent No.: US 8,856,941 B2
Cha et al.  (45) Date of Patent: Oct. 7, 2014

(54) STAGED CONTROL RELEASE IN BOOT PROCESS

(75) Inventors: Inhyok Cha, Yardley, PA (US); Yogendra C. Shah, Exton, PA (US); Lawrence Case, Austin, TX (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 100 days.

(21) Appl. No.: 13/084,840

(22) Filed: Apr. 12, 2011

(65) Prior Publication Data

US 2011/0302638 A1  Dec. 8, 2011

Related U.S. Application Data

(60) Provisional application No. 61/323,248, filed on Apr. 12, 2010, provisional application No. 61/357,474, filed on Jun. 22, 2010.

(51) Int. Cl.
*H04L 29/06* (2006.01)
*G06F 21/57* (2013.01)
*H04W 12/10* (2009.01)
*H04W 84/04* (2009.01)

(52) U.S. Cl.
CPC ............ *G06F 21/57* (2013.01); *H04W 12/10* (2013.01); *H04W 84/045* (2013.01)
USPC .......................................................... 726/26

(58) Field of Classification Search
CPC .................................................. G06F 21/575
USPC ......................................................... 726/26
See application file for complete search history.

(56) References Cited

U.S. PATENT DOCUMENTS

| 2003/0079141 | A1 | 4/2003 | Eitel et al. |
| 2006/0005034 | A1* | 1/2006 | Willman et al. ............... 713/182 |
| 2008/0313627 | A1 | 12/2008 | Segawa |
| 2009/0113558 | A1* | 4/2009 | Prabhakaran et al. .......... 726/27 |
| 2010/0185845 | A1* | 7/2010 | Takayama et al. ................ 713/2 |

FOREIGN PATENT DOCUMENTS

| EP | 1696360 A1 | 8/2006 | |
| JP | 2008-226159 | 9/2008 | |
| WO | WO 2006/002368 A2 * | 1/2006 | ............... G06F 1/00 |
| WO | WO 2008/001322 A2 | 1/2008 | |

OTHER PUBLICATIONS

PCT Application No. PCT/US2011/032036 : International Search Report and Written Opinion of the International Searching Authority, Oct. 4, 2011, 10 pages.
Japanese Patent Application No. 2013-505036: English translation of Notice of rejection mailed on Jan. 7, 2014, 4 pages.

* cited by examiner

*Primary Examiner* — Jason Gee
(74) *Attorney, Agent, or Firm* — Baker & Hostetler LLP

(57) ABSTRACT

Integrity validation of a network device may be performed. A network device comprising a secure hardware module, may receive a root key. The secure hardware module may also receive a first code measurement. The secure hardware module may provide a first key based on the root key and the first code measurement. The secure hardware module may receive a second code measurement and provide a second key based on the first key and the second code measurement. The release of keys based on code measurements may provide authentication in stages.

14 Claims, 24 Drawing Sheets

Figure 3. A Device with a Binding between Device Validation and Device Authentication Figure 4. A Physical Binding of Integrity Checking and Authentication, using a common TrE Figure 5. Binding between Validation and Pre-Shared-Secret based Device Authentication for H(e)NB Device Figure 6. Binding of Validation and Pre-Shared-Key based Dev. Authentication by use of Same Protocol/Session/Message Figure 7. Binding due to TrE granting conditional access to DAF upon Validation Success Figure 8. Binding between Validation and Certificate based Device Authentication for H(e)NB Device Figure 9. Binding of Validation and Certificate based Dev. Authentication by use of Same Protocol/Session/Message Figure 10. Binding due to TrE granting conditional access to DAF upon Validation Success Figure 11. Binding due to Gating, for general functions

STAGED CONTROL RELEASE IN BOOT PROCESS

CROSS-REFERENCE TO RELATED APPLICATIONS

This application is based on, and claims priority to, U.S. Provisional Patent Application No. 61/323,248, filed on Apr. 12, 2010, and U.S. Provisional Patent Application No. 61/357,474, filed on Jun. 22, 2010, the contents of which are hereby incorporated by reference in their entirety.

BACKGROUND

Traditional security methods may allow for the binary decision on the release of resources such as a single key used for authentication based on a successful secure boot from reset. Problems may occur when a successful boot from reset does not occur.

SUMMARY

Systems, methods, and instrumentalities are disclosed to perform integrity validation of a network device. A network device may comprise a secure memory. For example, the secure memory may be included in a secure hardware module. The secure memory may receive a root key. For example, a root key may be received by the secure memory at a time of manufacture or a time of provisioning. The root key may be stored on the secure memory and may not be visible to software or hardware outside of the secure hardware module.

The secure hardware module may receive a first code measurement (a measurement of first code). For example, a processor such as a processor associated with the network device comprising the secure hardware module may select a first portion of code to measure. The first portion of code may be stored in a memory associated with the network device, e.g., ROM memory, RAM memory, etc. The processor may measure the selected first portion of code resulting in the first code measurement. The processor may provide the measurement to the secure hardware module.

The secure hardware module may generate a first key based on the root key and the first code measurement. For example, the secure hardware module may derive or release the first key. A generated first key is valid when the first code measurement is valid and is invalid when the first code measurement is invalid. For example, the secure hardware module may derive a first key based in part on the first code measurement. If the first code measurement is invalid, then the derived first key is also invalid. The generated first key may be generated by the secure hardware module in order to provide access to resources. Access to resources may be provided without a code measurement when the code is stored in the secure memory.

The first key may relate to a first stage of trust associated with a first function (e.g., one or more resources may be associated with the first function). Further, a first stakeholder may use the valid first key to access the first function. If the first key is not valid, the first stakeholder may not access the first function. That is, the secure hardware module may prevent access to the first function when the first code measurement is invalid.

The secure hardware module may receive a second code measurement (a measurement of second code). The secure hardware module may generate a second key based on the first key and the second code measurement. The second key may relate to a second stage of trust associated with a second function (e.g., one or more resources may be associated with the second function). Further, a second stakeholder may use the valid second key to access the second function. Key release may be limited to a last known good boot stage (e.g., a last known boot stage for which there was a successful authentication).

The generation and/or release of resources such as keys and functionalities based on integrity measurements of hardware, code, and/or data may provide authentication in stages. For example, a device may comprise several layers with each layer having its own authentication secret. Each authentication secret may correspond to a particular stakeholder in a layer of device capabilities such as manufacturer firmware, trusted execution code, operating system, and third party applications. As a further example, a valid first key may be associated with a valid authentication to a first boot stage. The valid first key may be used by a device manufacturer (e.g., a first stakeholder) to access firmware on the network device to perform remediation on the firmware. A valid second key may be associated with a valid authentication of one or more software components during a later boot stage (e.g., a middle boot stage). The valid second key may be used by a device manager (e.g., a second stakeholder) to access the software components, e.g., to perform remediation on the software. By providing valid keys for stages that have successfully authenticated, access may be granted commensurate with a last stage that did not fail authentication.

The number of stages in the disclosed multi-stage authentication may vary and is not limited. Further, multiple authentication paths may be provided. That is, authentication may branch in different ways at a given stage of integrity checking. For example, each stakeholder may provide one or more policies relating to one or more stages of authentication. At each stage, the authentication may branch in a different way based on stakeholder policies. A stakeholder may be able to manage its policies externally.

BRIEF DESCRIPTION OF THE DRAWINGS

A more detailed understanding may be had from the following description, given by way of example in conjunction with the accompanying drawings.

DETAILED DESCRIPTION OF ILLUSTRATIVE EMBODIMENTS

The figures may relate to exemplary embodiments in which the disclosed systems, methods and instrumentalities may be implemented. However, while the present invention may be described in connection with exemplary embodiments, it is not limited thereto and it is to be understood that other embodiments may be used or modifications and additions may be made to the described embodiments for performing the same function of the present invention without deviating therefrom. Some of the disclosed systems and methods may provide secure multiple stage authentication. Although generally described with reference to wireless devices and networks, the disclosed systems, methods, and instrumentalities are not limited to such applications and may be applicable to any appropriate devices, networks and/or systems that may be capable of implementing the disclosed authentication. Further, the following disclosure may describe multiple stage authentications in relation to boot-stage activities. However, the description is for illustration and the disclosed systems, methods, and instrumentalities are not limited to boot-stage implementations. Multiple stage authentication may be broadly applicable to implementations in any appropriate multi-stage process.

When referred to hereafter, the terminology "wireless transmit/receive unit (WTRU)" includes but is not limited to a user equipment (UE), a mobile station (MS), an advanced mobile station (AMS), a station (STA), a fixed or mobile subscriber unit, a pager, a cellular telephone, a personal digital assistant (PDA), a computer, or any other type of device capable of operating in a wireless environment. The terms WTRU and UE may be used interchangeably. When referred to hereafter, the terminology "base station" includes but is not limited to a Node-B, an advanced base station (ABS), a site controller, an access point (AP), a home Node-B (HnB) or any other type of interfacing device capable of operating in a wireless environment. The terminology "WTRU" and "base station" are not mutually exclusive.

Figure 1:
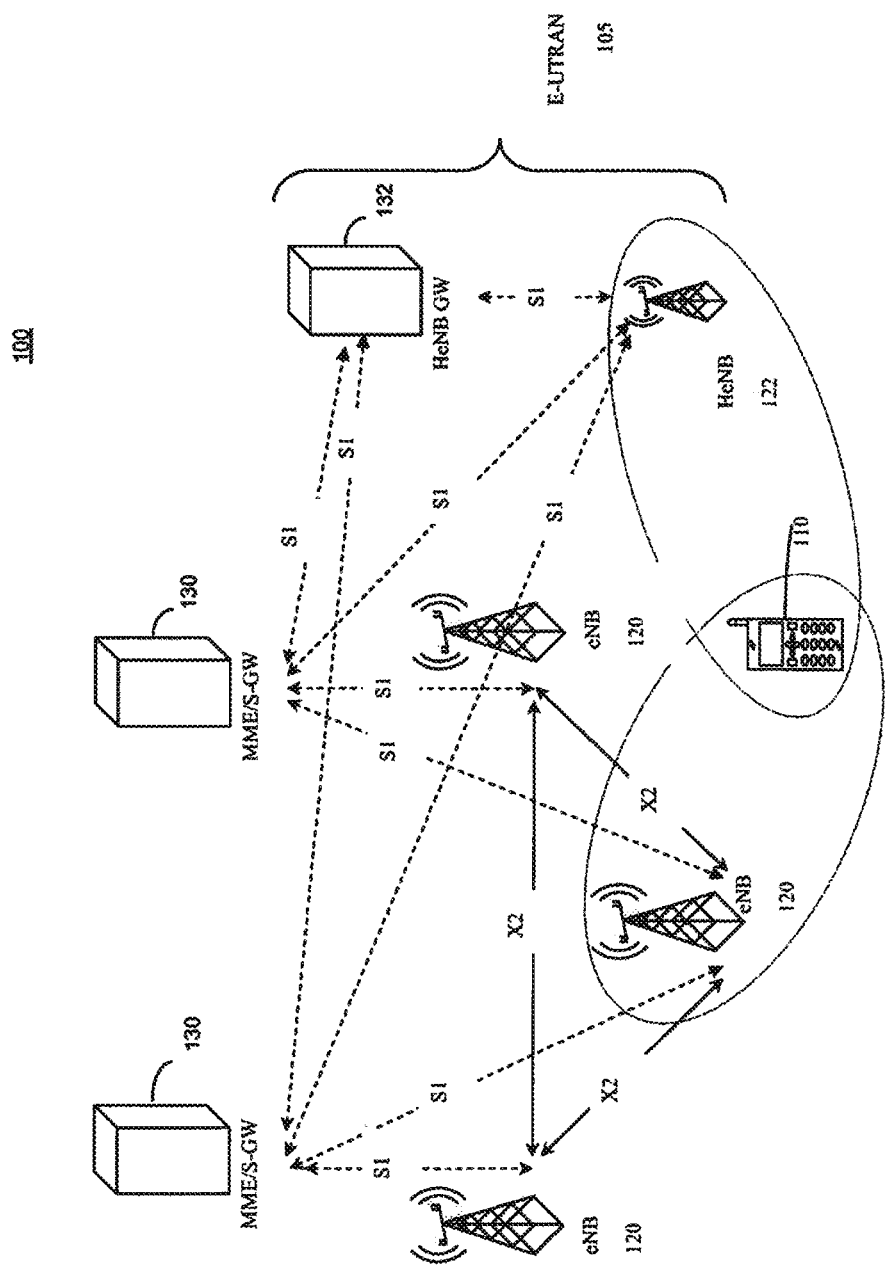
FIG. 1 is a diagram of an example Long Term Evolution (LTE) wireless communication system.

FIG. 1 is a diagram of an example Long Term Evolution (LTE) wireless communication system/access network 100 that includes an Evolved-Universal Terrestrial Radio Access Network (E-UTRAN) 105. The E-UTRAN 105 may include several E-UTRAN Node-Bs (eNBs) 120, a Home eNB (HeNB) 122, and a HeNB Gateway (HeNB GW) 132. The WTRU 110 may be in communication with an eNB 120, the HeNB 122, or both. The eNBs 120 may interface with each other using an X2 interface. Each of the eNBs 120 and the HeNB GW 132 may interface with a Mobility Management Entity (MME)/Serving Gateway (S-GW) 130 through an S1 interface. The HeNB 122 may interface with the HeNB GW 132 through an S1 interface, with the MME/S-GW 130 through an S1 interface, or with both. Although a single WTRU 110, a single HeNB, and three eNBs 120 are shown in FIG. 1, it should be apparent that any combination of wireless and wired devices may be included in the wireless communication system/access network 100.

Figure 2:
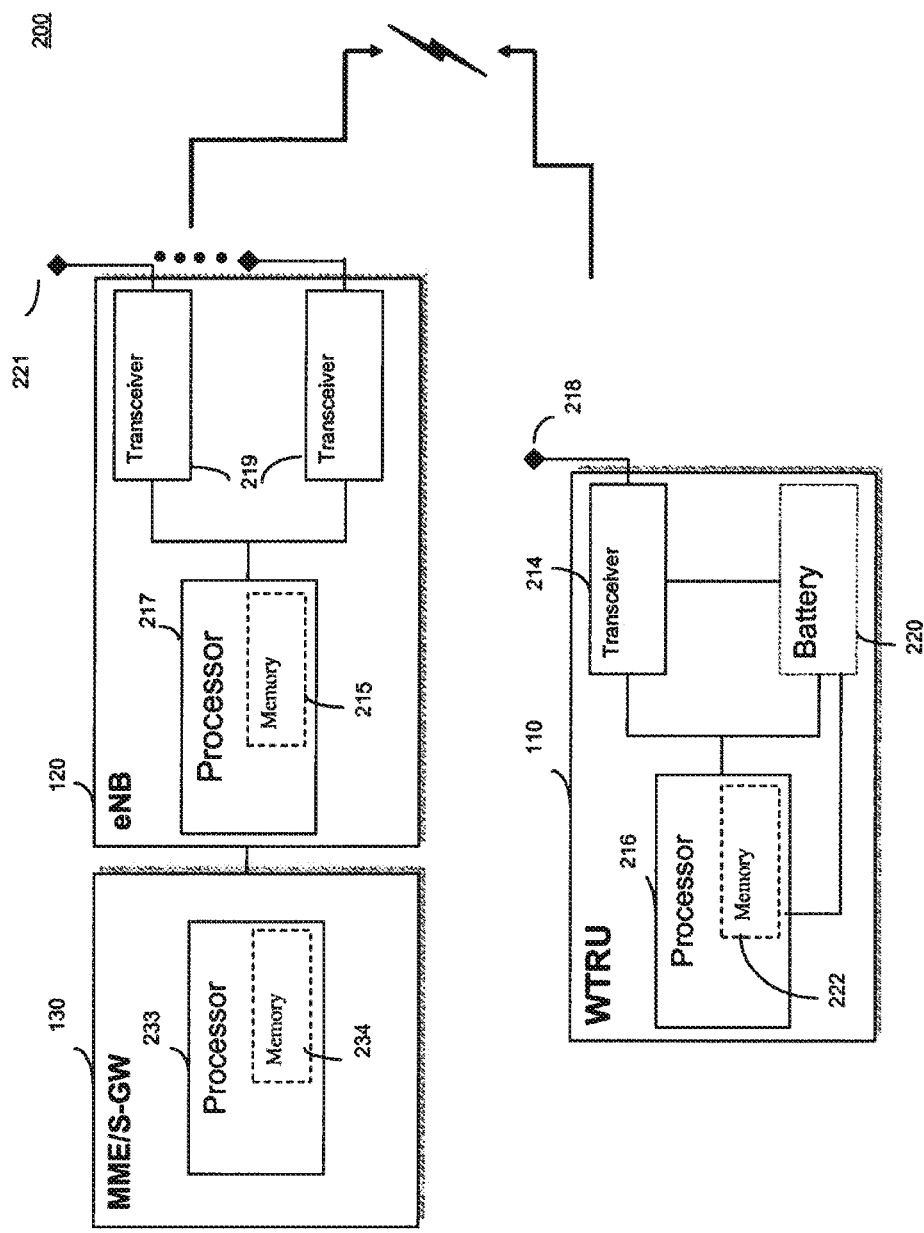
FIG. 2 is a block diagram of an example of an LTE wireless communication system.

FIG. 2 is a block diagram of an example of an LTE wireless communication system 200 including the WTRU 110, the eNB 120, and the MME/SGW 130. Although the eNB 120 and MME/S-GW 130 are shown for simplicity, it should be apparent that an example of a HeNB 122 and HeNB GW 132 may include substantially similar features. As shown in FIG. 2, the WTRU 110, the eNB 120 and the MME/S-GW 130 may be configured to support a mobile originated power saving mode.

In addition to the components that may be found in a typical WTRU, the WTRU 110 may include a processor 216 with an optional linked memory 222, at least one transceiver 214, an optional battery 220, and an antenna 218. The processor 216 may be configured to perform bandwidth management. The transceiver 214 may be in communication with the processor 216 and the antenna 218 to facilitate the transmission and reception of wireless communications. An optional battery 220 may be used in the WTRU 110 to power the transceiver 214 and the processor 216.

In addition to the components that may be found in a typical eNB, the eNB 120 may include a processor 217 with an optional linked memory 215, transceivers 219, and antennas 221. The processor 217 may be configured to perform bandwidth management. The transceivers 219 may be in communication with the processor 217 and antennas 221 to facilitate the transmission and reception of wireless communications. The eNB 120 may be connected to the Mobility Management Entity/Serving Gateway (MME/S-GW) 130 which may include a processor 233 with an optional linked memory 234.

The LTE network shown in FIGS. 1 and 2 is just one example of a particular communication network and other types of communication networks may be used. The various embodiments may be implemented in any wireless communication technology. Some example types of wireless communication technologies include, but are not limited to, Worldwide Interoperability for Microwave Access (WiMAX), 802.xx, Global System for Mobile communications (GSM), Code Division Multiple Access (CDMA2000), Universal Mobile Telecommunications System (U1VITS), or any future technology.

When referred to hereafter, the terminology "Macro Cell" includes but is not limited to a base station, an E-UTRAN Node-B (eNB), or any other type of interfacing device capable of operating in a wireless environment. When referred to hereafter, the terminology "Home Node-B (HNB)" includes but is not limited to a base station, a Home evolved Node-B (HeNB), a femtocell, or any other type of interfacing device capable of operating in a Closed Subscriber Group wireless environment.

For purposes of explanation, the various embodiments are described in a Long Term Evolution (LTE) context, but the various embodiments may be implemented in any wireless communication technology. Some example types of wireless communication technologies include, but are not limited to, Worldwide Interoperability for Microwave Access (WiMAX), 802.xx, Global System for Mobile communications (GSM), Code Division Multiple Access (CDMA2000), Universal Mobile Telecommunications System (UMTS), or any future technology.

The terms Client and Device may be used synonymously. In addition, the terms 'device integrity validation,' 'device validation,' and 'validation' may be used synonymously as well. Validation may be a process of verifying integrity of parts or whole components that collectively constitute a communication or computing device. The parts or components may be, for example, hardware (HW), software (SW), firmware (FW), and/or configuration data. Device authentication may refer to a process where the identity of the communication or computing device is verified for its authenticity to a verifier.

In the context of an H(e)NB, a binding of procedure, such as binding the results of device integrity validation of the H(e)NB with the procedure or result of device authentication may be performed. Various methods may be used to perform binding of device validation and device authentication.

Although the examples of binding methods applied to the device integrity validation and device authentication are for 3GPP H(e)NBs, it should be understood that these methods may be applied to any other communication or application device that has a requirement for device integrity validation as well as device authentication.

Typical device authentication procedures in the H(e)NB may be limited to verifying the AKA credentials contained in a Trusted Environment (TrE). These procedures may not address device authentication or validation and/or the possibility of binding hosting party authentication to a device authentication.

A binding between validated device and process and/or result of device authentication may be performed. Two types of binding may be performed. A logical binding, where a logical correspondence may be claimed and verified between a logical entity (or entities or process or data) used in or used by the process of device validation and the logical entity (or entities or process or data) used by the process of device authentication. A physical binding, where a specific physical entity used in or used by the device validation process (such as a physical TrE and/or a specific secret or key it has) may have a direct corresponding relationship to a physical entity (such as application software files or data or keys) that are either used in or used by a device authentication process.

Figure 3:
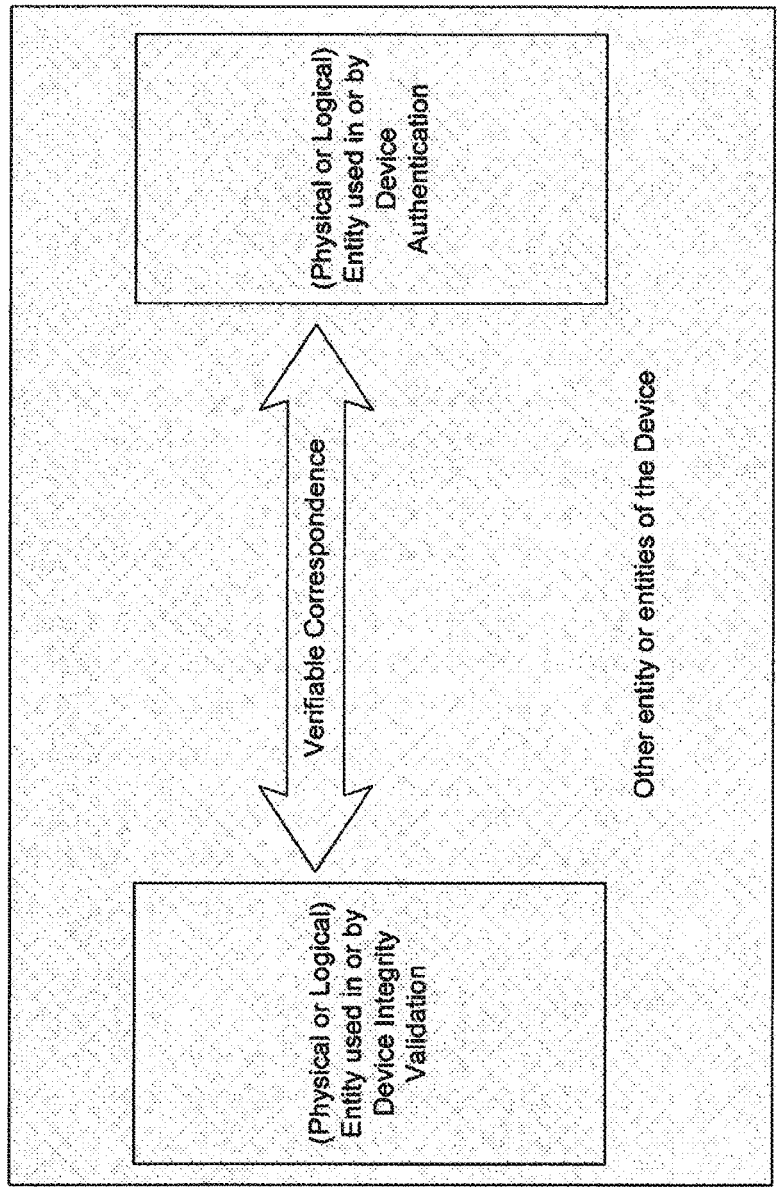
FIG. 3 illustrates an example device with a binding between device validation and device authentication.
Figure 4:
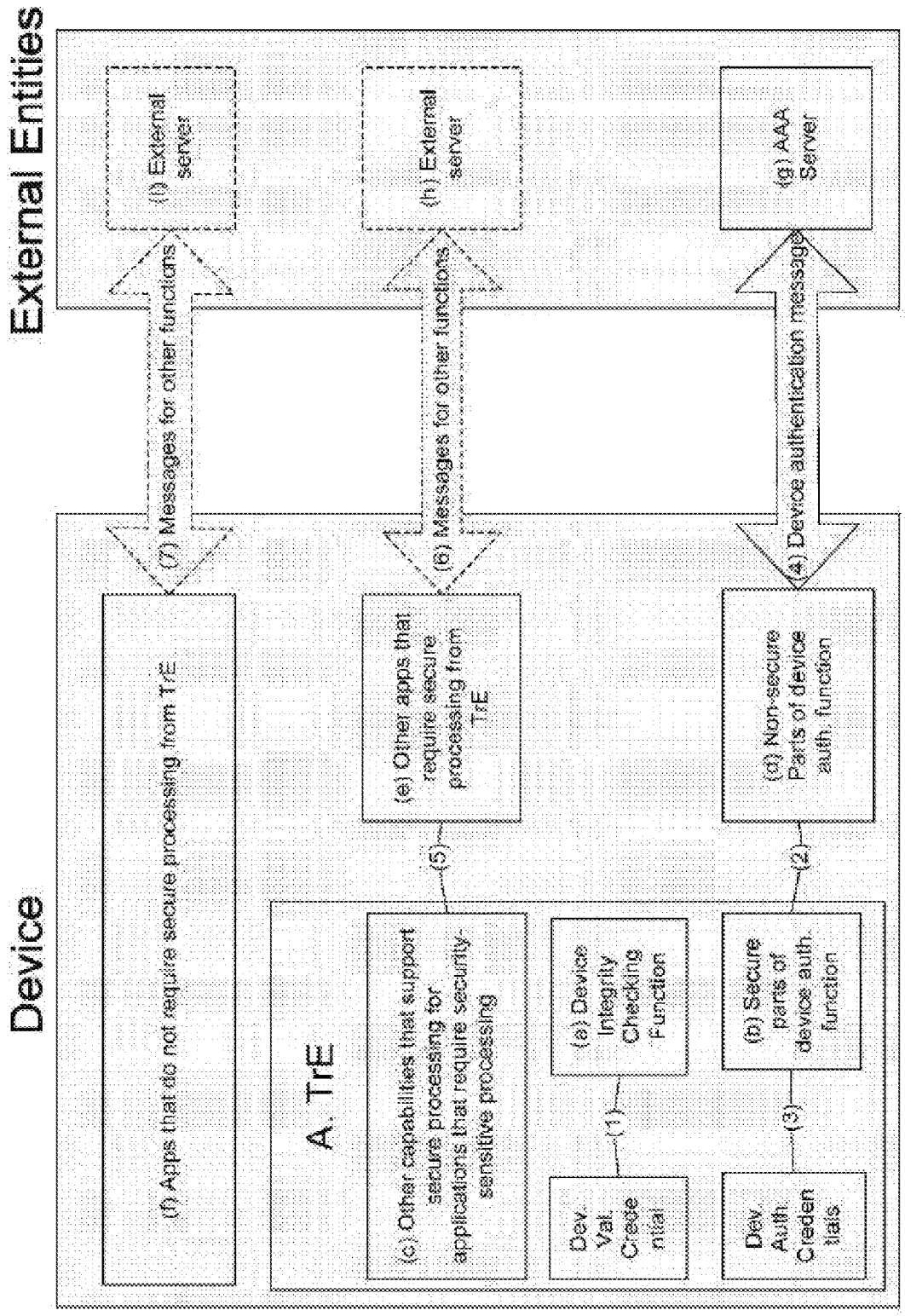
FIG. 4 illustrates an example of a physical binding of integrity checking and authentication using a common trusted environment (TrE).

FIG. 3 shows the two different types of bindings represented as functionalities of a device. In both cases, the actual device integrity validation procedure may be performed by a trusted entity, for example a hardware-based secure environment that is securely embedded into the device. In the context of the H(e)NB, such a trusted entity may be referred to as a TrE of the H(e)NB. FIG. 4 is a diagram of a binding mechanism that uses a common TrE that performs 1) integrity checking of the device, as well as 2) critical or sensitive functions of device authentication.

In FIG. 4, a secure and trusted TrE may reside inside a communicating or computing device. The TrE may perform one or more of the following functions. Device integrity checking, such as device integrity validation where such validation may be performed locally on the device. The TrE may include interfaces (1) of FIG. 4 and the capability to access and use credentials for validation, stored within or by the TrE. The TrE may secure part of the device authentication process that requires secure processing including interfaces (3) of FIG. 4 and the capability to access and use secret credentials for device authentication, stored within or by the TrE. Other capabilities may include performing secure processing to support applications residing outside of the TrE that may require security-sensitive processing. These applications may access or use their own secret credentials (not shown in FIG. 4). The TrE may include interfaces to functions/applications of the device but that are outside of TrE. Examples include, but are not limited to, an interface (2) of FIG. 4 for device authentication processing on the device, and/or an interface (5) of FIG. 4 for other, non-authentication applications that may require secure processing from within the TrE.

In addition, the non-TrE part of the device may perform one or more of the following types of functions. One function may be a non-secure part of a device authentication function. Another function may be for applications that do not require secure processing from the TrE. Another function may be for applications (other than device authentication) that require secure processing from the TrE. The non-TrE part of the device may support interfaces, including interfaces (4) of FIG. 4 for device authentication, a message exchange between the device's capability (d) and/or a network based AAA server (g). Interface (6) of FIG. 4 may be used for message exchanges for functions that may require secure processing from within the TrE on the Device's side. Interface (7) of FIG. 4 may be used for message exchanges for functions that may not require security processing from within the TrE on the device's side. Credentials used for device authentication and the credentials used for device integrity validation may not be the same. However, such credentials may be configured to be bound to each other.

FIG. 4 is an example of a device that may use a physical binding in a H(e)NB. For example, the physical binding may be performed by the use of a TrE for both validation and device authentication. In a H(e)NB, for example, the TrE may be designed to perform the entire processes required for device validation. These processes may include at least a part of the process that may require the most secure or trusted processing of the processes required for device authentication, or the whole process itself. If, for example, the device authentication protocol is designed to use a pre-shared-key based approach such as EAP-AKA, the TrE holding the AKA credentials and the H(e)NB may be further bound to each other. For example, the H(e)NB may encrypt the data that is needed to compute the AKA credentials used for device authentication such that decryption may be limited to the TrE before conveying the data into the TrE. The TrE may securely store the key needed to decrypt this data. In addition, a further binding may be obtained by way of combining information about device validation and device authentication in the same session of a common security protocol, such as IKEv2. In this case, device validation suitable for such binding may be such that it would require a certain interaction and message exchange between the H(e)NB (and its TrE) and the network entities.

As described earlier, logical binding is another type of binding that may be used for device validation and authentication. An example of a logical binding may be to use the same packet, message, session, or successive sessions of the same or common communication protocol message to perform messages required to be transferred out of the device for the purposes of device validation and device authentication. It is noted that the physical binding methods and logical binding methods may be used in combination with each other.

Device validation may be bound to pre-shared-secret-based client authentication.

Device validation of a H(e)NB may be performed to be bound to the pre shared-key based authentication in one or any combination of the following physical and/or logical mechanisms of binding. By physically binding the trusted environment (TrE) to the H(e)NB by using cryptographic keys and credentials for message exchanges between the TrE and the rest of the H(e)NBs, the keys and credentials may be protected at least inside the TrE, and the H(e)NB. This may apply to message exchanges between the TrE and the H(e)NB for device authentication.

Figure 5:
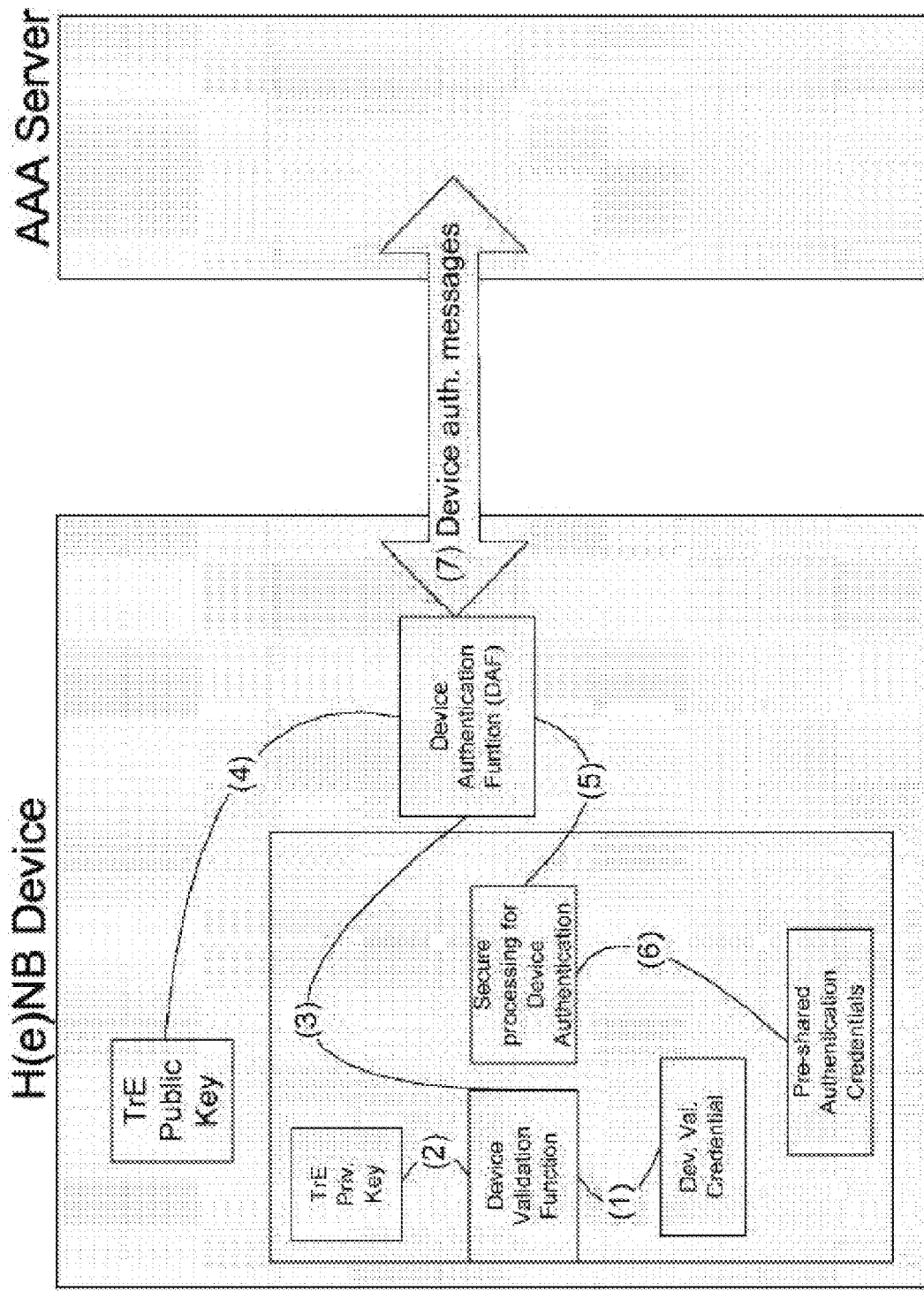
FIG. 5 illustrates an example of a binding between validation and pre-shared secret based device authentication.

Referring to FIG. 5, the TrE may first check the integrity of the H(e)NB. If successful, it may proceed to link (2) of FIG. 5, if not, the TrE may not proceed to link (2) but instead may lock the functionality, possibly including the device authentication function of the H(e)NB. In order to check the integrity of the H(e)NB, the TrE may use the Device Validation credential stored in the TrE (See the link (1) in FIG. 5).

In link (2), the TrE may be equipped with a key pair, of which the private part is stored securely inside the TrE and the public part is made available to the H(e)NB. The manufacturer of the H(e)NB may generate this key pair and provide the certificate needed to make the public key available to the H(e)NB. The TrE's device validation functionality may use the TrE private key to sign a message (in link (2) depicted in FIG. 5) to indicate to the device authentication function outside of the TrE one or more of the following, for example: the ID of the TrE, the message indicating that the TrE has successfully verified the integrity of the rest of the H(e)NBs, and/or authorization data indicating that the TrE authorizes the device authentication function and may be authorized to proceed with the procedures of device authentication. The TrE private key may be used for signing this authorization message. This authorization message may authorize the use of some secure processing capabilities of the TrE by the device authentication function on the H(e)NB Device.

The transfer of the signed message from the TrE to the device authentication function outside of the TrE may be depicted by link (3) in the FIG. 5. The H(e)NB may use a TrE public key that it may need to verify the signature described in link (2) above. The public key may be either pre-provisioned in a certificate or otherwise made available to the device authentication function prior to its use. The use of the public key may be depicted by the line (4) in FIG. 5.

The device authentication function may use a secure processing capability for device authentication residing within the TrE, for the latter to perform security-sensitive functions that may be required for device authentication procedures. This interface for requesting and obtaining this service may be depicted by line (5) in FIG. 5. The secure processing capability for device authentication may use the secret device authentication credentials pre-stored in the TrE to compute data that the device authentication function may need to send to the AAA Server for the latter to authenticate the H(e)NB Device. This may be depicted in line (6) in FIG. 5.

The device authentication function may proceed to exchange data, including the data computed from the secure processing capability for device authentication provided by the TrE, with the AAA Server, such that the AAA server may authenticate the identity of the H(e)NB Device. This may be depicted as line (7) in FIG. 5. This function may be carried on a suitable message exchange protocol. For example, in the case of the H(e)NB, protocols such as IKEv2, TLS, TR069 (an application layer protocol), OMA-DM protocols, or even higher-layer protocols such as HTTPS may be considered. Note that the device authentication function may perform the security-insensitive functions by itself.

The validation and device authentication may be bound by having the H(e)NB and the TrE performing, collectively, a designated part of the procedure of device validation and the procedure of authentication using the same packet or same message. This may be performed in a common communication session or in successive session(s) of a common security protocol. Example of such protocols may include the IKEv2 protocol, TLS, TR069, OMA-DM, and HTTPS. The protocol may use a pre-shared-secret-based protocol, an asymmetric key based protocol, a symmetric key based protocol, etc.

Figure 6:
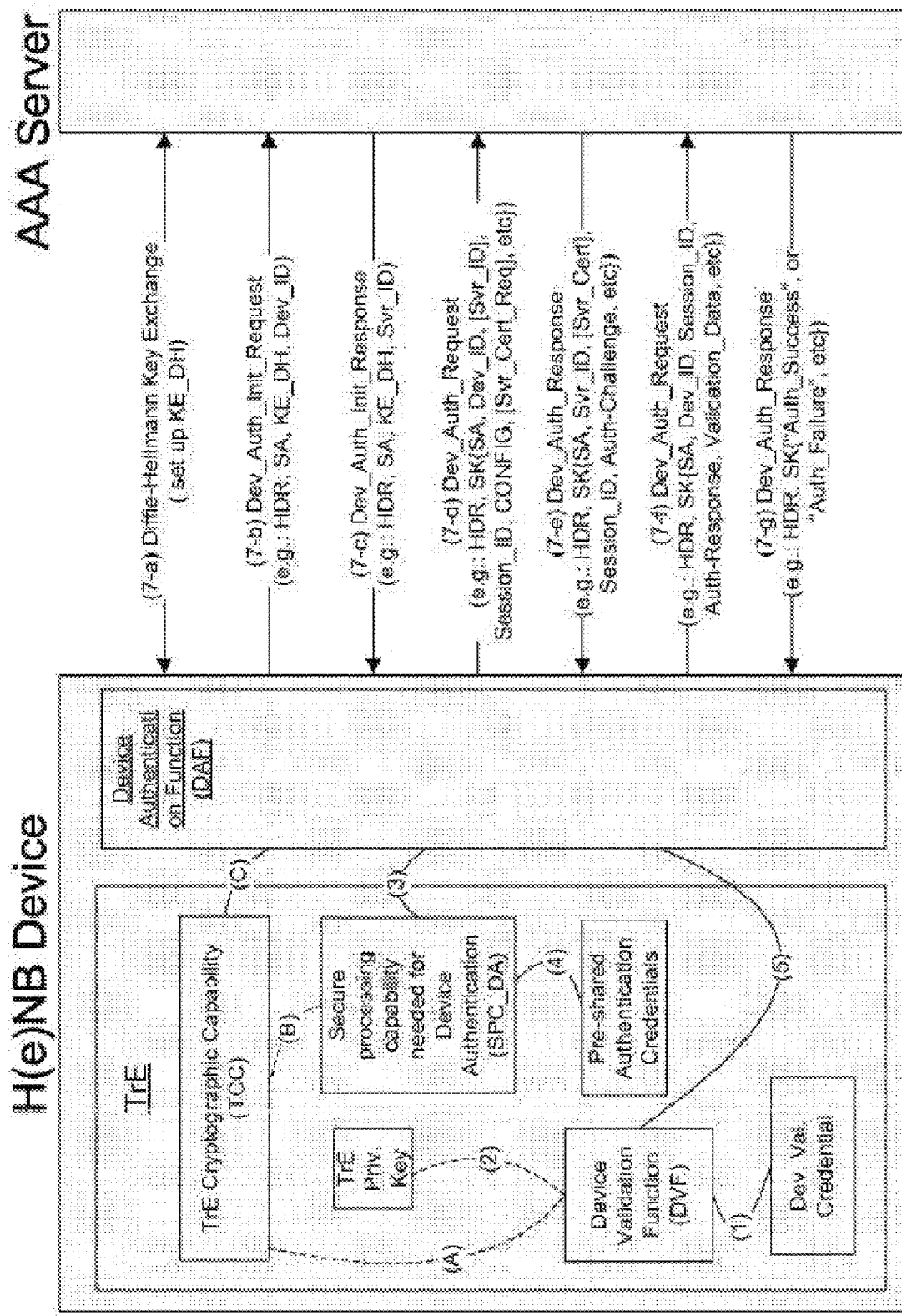
FIG. 6 illustrates an example of validation and pre-shared-key based authentication.

FIG. 6 is an example of such a binding mechanism, where the validation data and a part of the authentication data may be sent in the same protocol/session/message. In FIG. 6, line (1) shows that the device validation function (DVF) inside the TrE may perform the necessary device-integrity-checking to verify whether the integrity of the components of the H(e)NB are preserved or not, using device validation credentials. Note that the DVF may use functionality provided by the TrE's cryptographic capability (TCC) to perform some functions required for device integrity checking and verification. This relationship may be depicted by the dotted line (A) of FIG. 6.

At some later time, the device authentication function (DAF) inside the H(e)NB may perform a procedure such as a Diffie-Hellmann (D-H) procedure to set up an unauthenticated shared-key for encryption and signing between itself and an external AAA Server. This step, depicted by Line (7-a), may be a precursor step for device authentication, and may set up an unauthenticated cryptographic key for use during the device authentication message protocol to follow. Note that the DAF may depend on the TrE's Crypto Capability (TCC) to perform some of the interim-steps needed for the D-H procedure. The dotted line (C) may be an interface between the DAF and the TCC that the DAF may use to request and obtain the cryptographic services from the TCC.

The DAF may initiate a device authentication procedure by sending a Dev_Auth_Init_Request message to the AAA Server. If an IKEv2 protocol were used, for example, this message may be carried on an IKE_SA_INIT Request message. In this Dev_Auth_Init_Request message, the DAF may include a header (HDR), a security association (SA) that suggests, for example, security parameter index (SPI) among other things to the AAA server, the server's public key KE_DH generated out of the D-H process, and/or the device's own ID Dev_ID. This step may be depicted by line (7-b) in the FIG. 6.

The AAA server may send the DAF a Dev_Auth_Init_Response (a IKE_SA_INIT Response message if IKEv2 were to be used as the protocol) to the device's DAF. This message may include such information elements as the header (HDR), the device's public key KE_DH generated out of the D-H process, and the server's own ID Syr_ID. This step is depicted by line (7-c) in FIG. 6.

The DAF may send, in a Dev_Auth_Request message (which may be an IKE_AUTH Request message in case IKEy2 was the chosen protocol), such elements as the header, the SA, the Dev_ID, configuration (CONFIG), and/or an optional Server Certificate request (Svr_Cer_REQ) to the AAA server, as depicted by line (7-d) in FIG. 6. Note that from here, some of the information elements may be protected by encryption and signing by the keys generated from the D-H process. For example, the Dev_ID, Session_ID, CONFIG, and optional Server Cert Request may all be protected for confidentiality and integrity by use of the keys generated from the D-H Process. Note that the DAF may use the TrE's Crypto Capability (TCC) to perform the encryption and signing using the D-H generated keys. This relationship may be depicted by line (B) in FIG. 6.

The AAA Server may send to the DAF a Dev_Auth_Response message (which would be an IKE_AUTH Response message if IKEy2 were used as the protocol), including, among other things such as the header, the Syr_ID, Session_ID, and optionally a Server Certificate (Svr_Crt) if one was requested by the DAF, an Authentication Challenge (Auth-Challenge) based on the shared authentication secret (shown as stored in the TrE in FIG. 6) between the H(e)NB and the AAA Server. This may be depicted as line (7-e) in FIG. 6.

The DAF may send to the AAA Server a Dev_Auth_Request message (which may be another IKE_AUTH Request message if IKEv2 were used) that may include, among other things such as the header, the Dev_ID, Session_ID, the Authentication-Challenge Response (AUTH) and/or a Validation Data (Validation_Data). This may be depicted by line (7-f) in FIG. 6. Note that the DAF may rely on the Secure Processing Capability for Device Authentication (SPC_DA) in the TrE to compute and forward the AUTH, as depicted by the line (3) in FIG. 6. Note that the SPC_DA may use the Pre-shared Authentication Secret Credential stored in the TrE to compute the AUTH, as depicted by the line (4) in FIG. 6. In addition, the SPC_DA may rely on the TrE's Crypto Capability (TCC) (see dotted line (C)). Note that the SPC may compute the AUTH. The Device Validation Function (DVF) may also sign the Validation_Data and any additional related supplementary data using a TrE Private Key before forwarding the Validation_Data to the DAF, as represented by line (5) in FIG. 6. The interface between the DVF and the TrE Private Key may be used to sign the Validation Data before forwarding it to the DAF, and is represented by the line (2). In this example, in addition to the physical binding of using the common TrE and its assets to perform both validation and device authentication (or some security-requiring parts of it), another logical binding mechanism may be used. The same protocol, the same session, and the same message may be used to send information elements on the results of both Device Validation (i.e., Validation_Data) and Device Authentication (i.e., the AUTH) from the Device to the AAA server.

The AAA, after receiving and then evaluating the AUTH parameter and the Validation_Data from the previous Dev_Auth_Request message of (see 6), may send a Dev_Auth_Response message to indicate to the Device's DAF whether the AAA server assesses the authentication as successful or not. This may be depicted by line (7-g) of FIG. 6.

Figure 7:
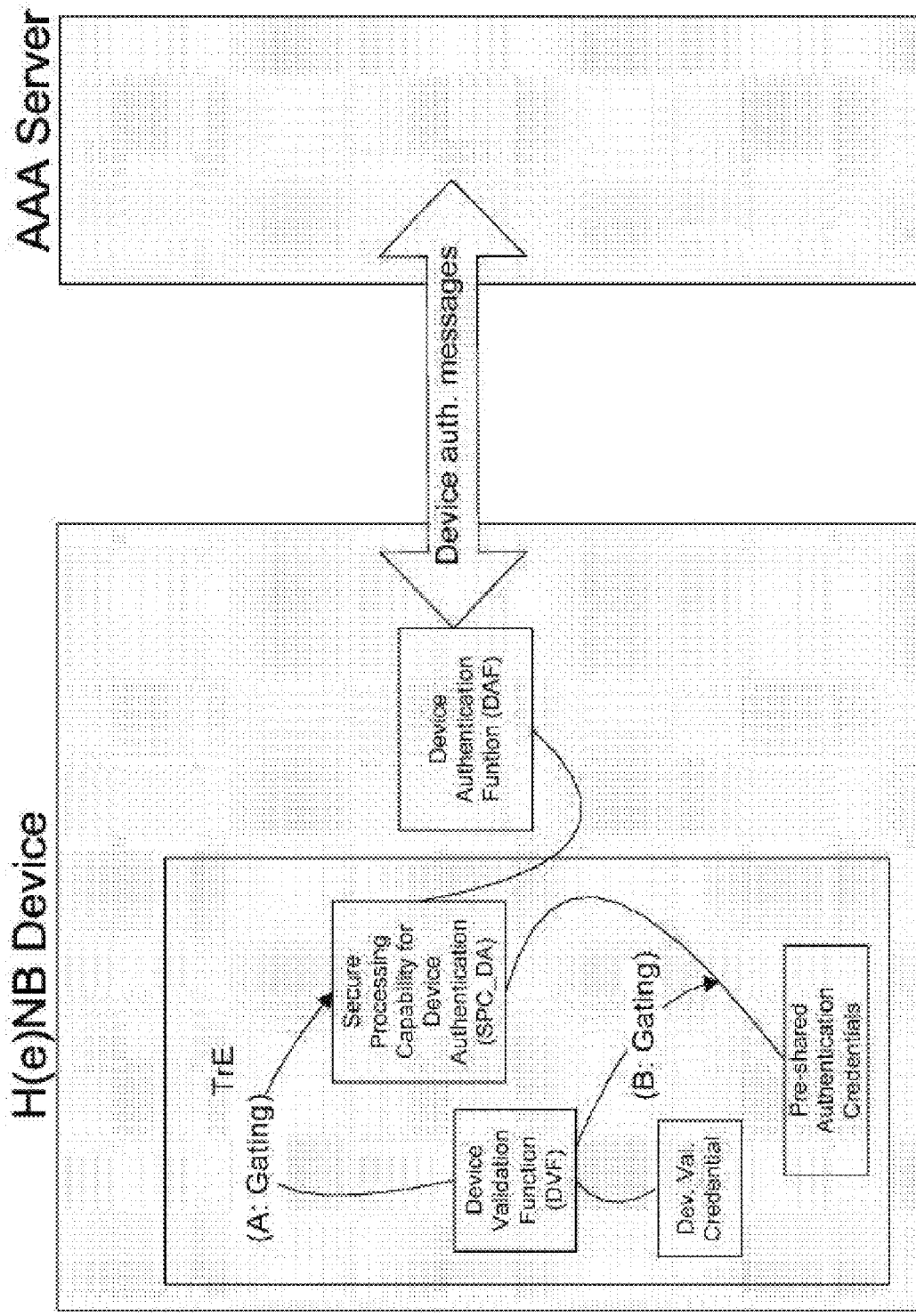
FIG. 7 illustrates an example of a binding due to TrE granting conditional access.

In a mechanism of binding, the TrE may control and release, to the DAF or to the SPC_DA, access to sensitive functions or sensitive data that may be needed to compute the necessary outputs for successful completion of authentication, which may be conditioned on the device validation procedure first being successfully completed such that access would be allowed. This type of binding mechanism may be considered as both a physical and logical binding mechanism. FIG. 7 is a diagram of an example of such a binding mechanism.

Referring to FIG. 7, the DVF may perform two types of gating procedures in terms of allowing the access to some of the functions or data held in the TrE. The gating procedures may depend on the status of the device integrity validation results. If the device integrity validation results are not successful, the DVF may prevent DAF from accessing the SPC_DA in the TrE, as represented by the line (A: Gating) in FIG. 7. The DVF may prevent the SPC_DA from accessing the device authentication credentials needed to perform a successful authentication toward the AAA server. These types of gating functionalities may provide other types of logical binding between device validation and device authentication.

Device validation may be bound to an authentication, such as a certificate-based device authentication.

Figure 8:
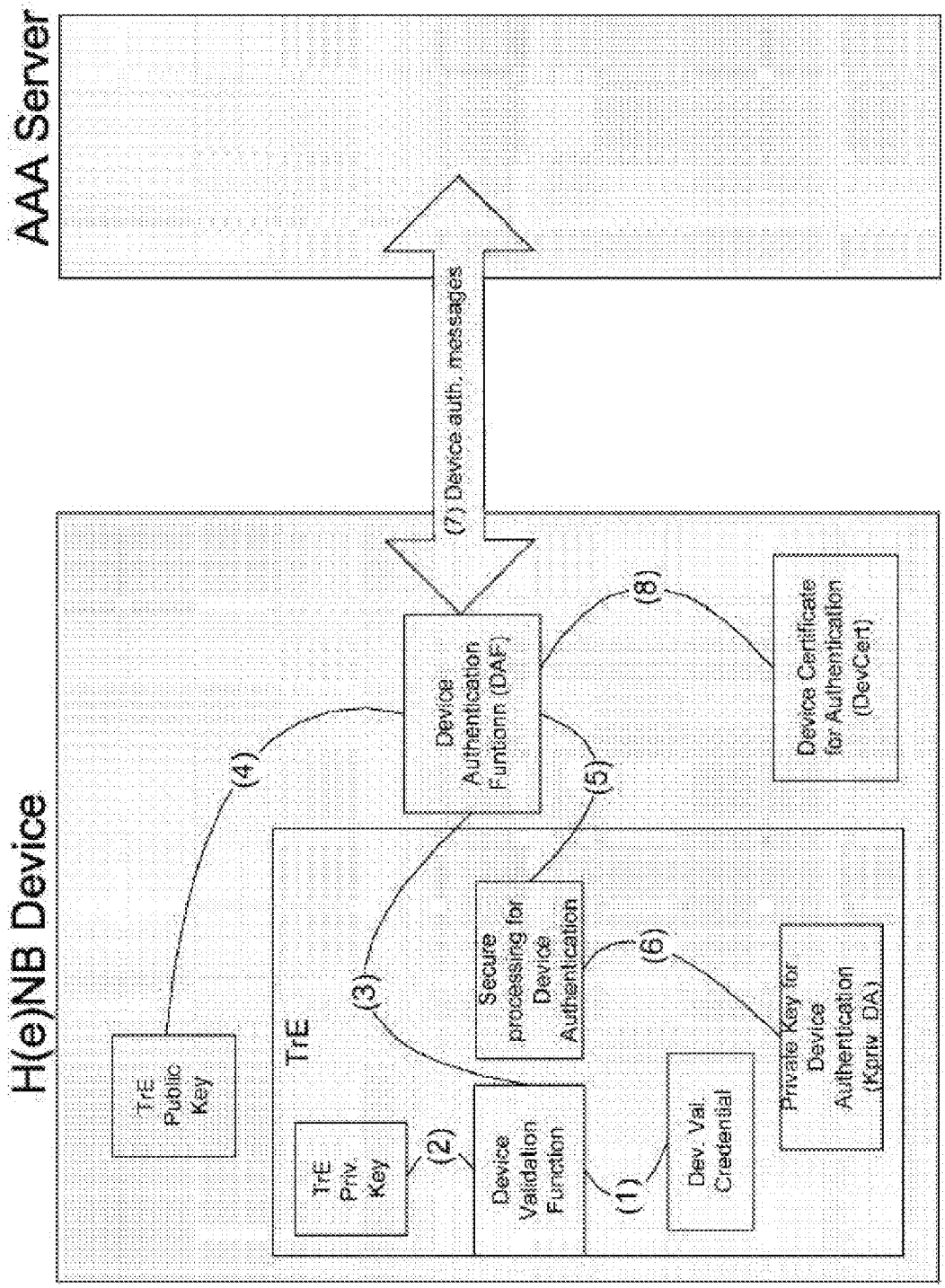
FIG. 8 illustrates an example of a binding between validation and certificate based device authentication.

Device validation of a H(e)NB may be bound to the certificate-based client and authentication may be achieved using mechanisms similar to the ones described above. Some of the possible mechanisms are described below. FIG. 8 is a diagram of an example using a physical binding, the common TrE may perform both the device integrity checking and validation, as well as some or all of the functions required for device authentication. These functions may be based on device certificates, for example. The procedure may be the same as those described for FIG. 5, except that the credential used for device authentication by the Secure Processing Capability for Device Authentication (SPC_DA) may be the Private Key for Device Authentication (Kpriv_DA), and, the Device Authentication Function (DAF) may send the Device Certificate (DevCert), along with some other material computed by the Kpriv_DA, to the AAA server.

Referring to FIG. 8, the key accessing and using the relationship between the SPC_DA and the Kpriv_DA may be as shown with respect to line (6). The certificate accessing and using the relationship between the DAF and the DevCert may be as shown with respect to line (8).

The H(e)NB and the TrE may perform, collectively, a designated part of the procedure of device validation and the procedure of certificate-based client authentication in a same packet, message, in a common communication session, or successive session(s) of a common security protocol, such as the IKEv2 protocol. Effectively, the process for this binding mechanism may be similar to the ones described for FIG. 6. Referring back to FIG. 6, a difference, compared to the case where pre-shared-secret based device authentication is used, may be the following. Instead of computing the sensitive interim results based on the AUTH-Challenge from the AAA Server and the pre-shared-secret the TrE holds (and the SPC_DA uses to compute and forward to the computation results to the DAF), the SPC_DA may compute them from the AUTH-Challenge based on the AUTH-Challenge from the AAA Server and the Kpriv_DA. The AAA Server may request the Device Authentication Certificate (DevCert) to the DAF. In response, the DAF, working with the SPC_DA, may compute and forward to the AAA server 1) the Authentication Response (AUTH) using the Kpriv_DA, and/or 2) a DevCert. Upon receiving the AUTH and the DevCert, the AAA server may first verify the validity of the DevCert, and then, using it, may verify the AUTH. If the verification checks, then it may have authenticated the Device.

Despite the differences, as far as the logical binding is concerned, a logical binding may be performed similarly as in the case of pre-shared-secret based authentication. For example, the DAF may forward the AUTH and DevCert to the AAA Server, and may also include the Validation_Data in the same message. This Validation_Message may be obtained from the DVF inside the TrE, and may be signed by the DVF by using a TrE Private Key.

Figure 9:
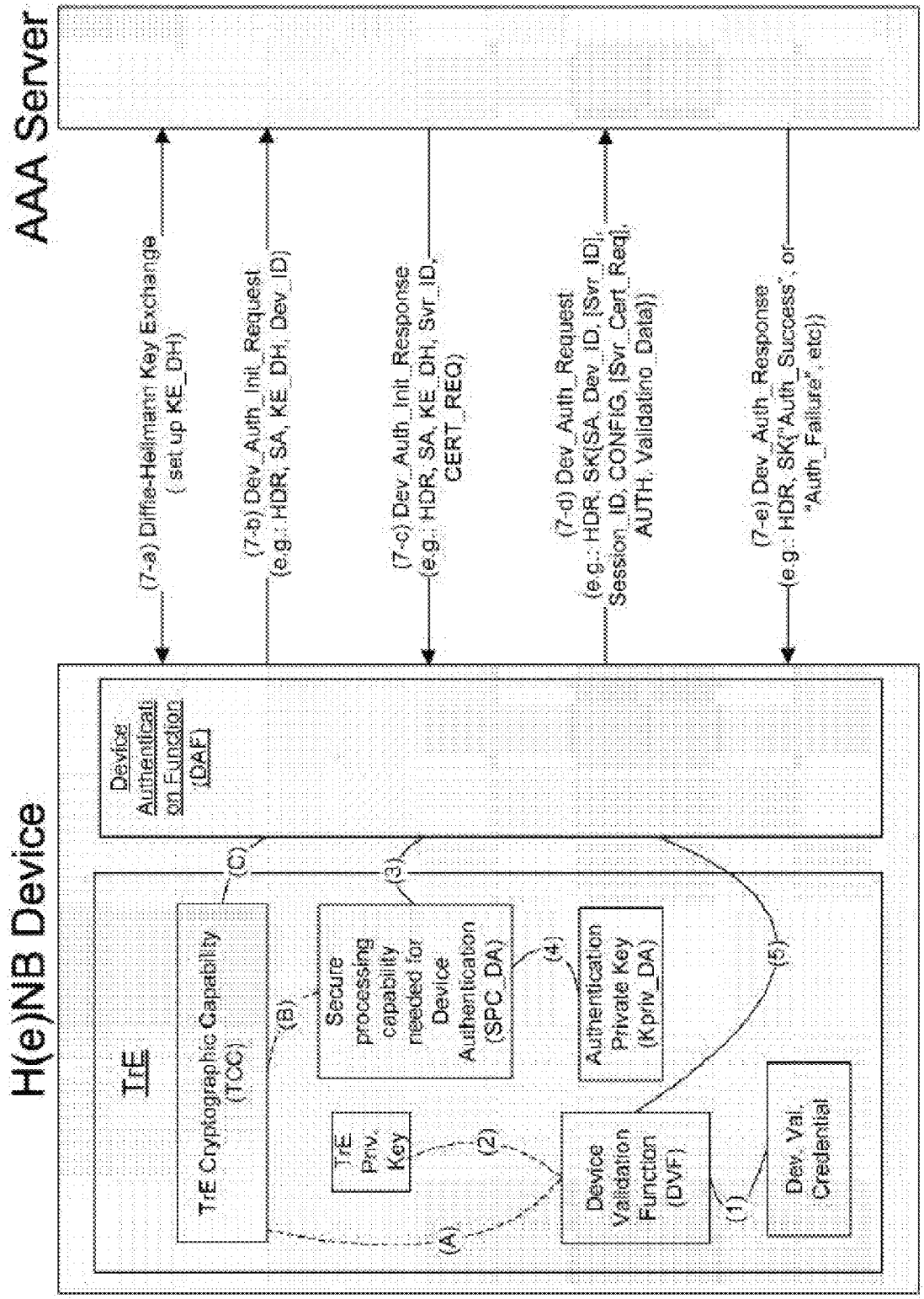
FIG. 9 illustrates an example of a binding of validation and certificate based authentication.

FIG. 9 is a diagram of an example binding mechanism. In this example, there is no authentication challenge per se from the AAA server to the Device. Rather, after the server requests the Device to send its certificate DevCert (see line (7-c)), the Device may send its DevCert as well as the AUTH (computed from the Kpriv_DA) to the AAA server, as depicted in line (7-d). The AAA server may verify the AUTH against the DevCert and send confirmation of the status of authentication (7-e).

Figure 10:
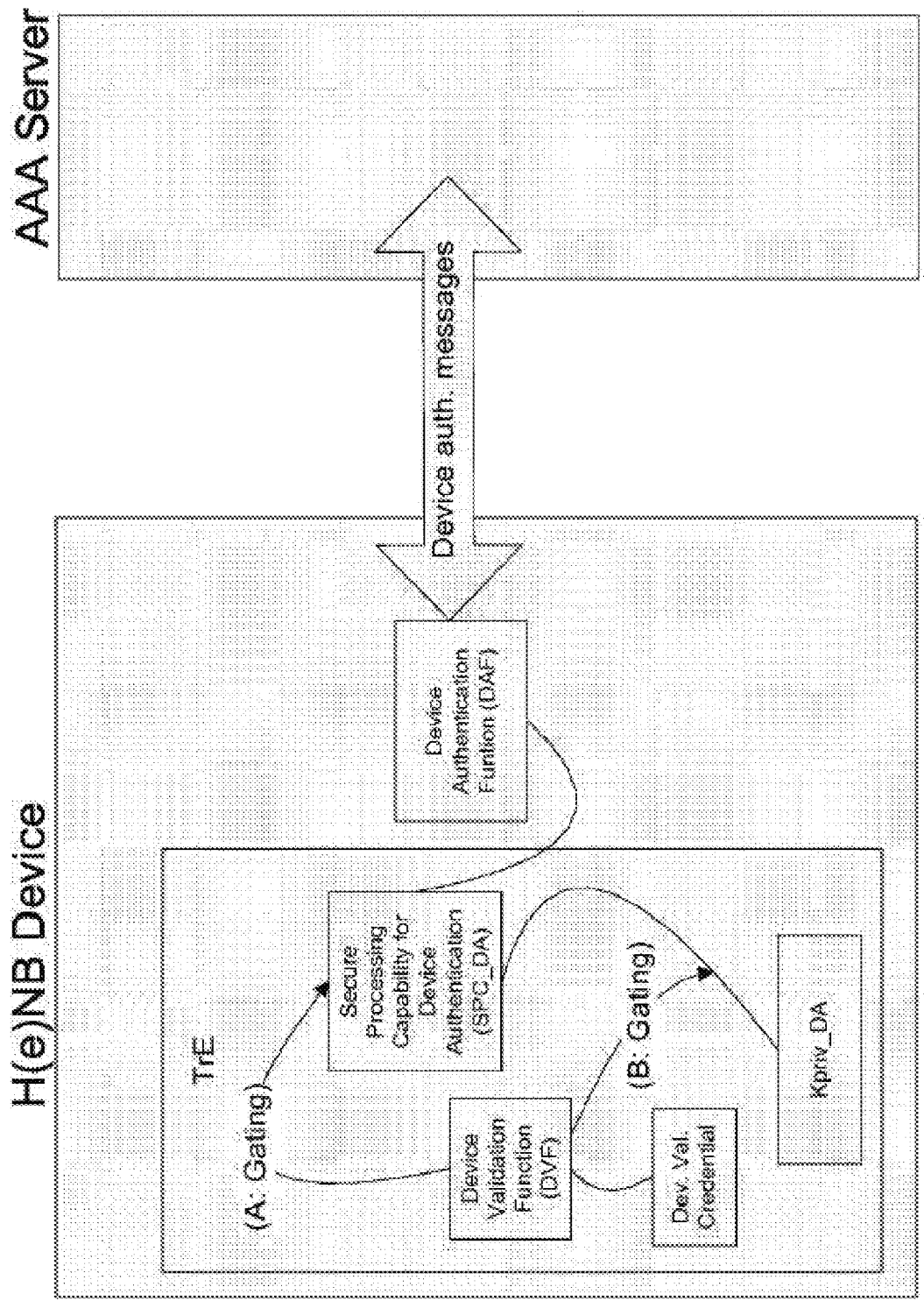
FIG. 10 illustrates an example of a binding due to TrE granting conditional access.

A gating type of binding may be implemented in a Certificate based authentication example. This example is similar to the pre-shared-secret based authentication example. FIG. 10 is a diagram of an example of such a binding mechanism. Referring to FIG. 10, the DVF may perform two types of gating procedures in terms of allowing access to some of the functions or data held in the TrE, depending on the status of the device integrity validation results.

If the device integrity validation results are not successful, the DVF may prevent the DAF from accessing the SPC_DA in the TrE, as represented by the line (A: Gating) in FIG. 10. Alternatively, the DVF may prevent the SPC_DA from accessing the Kpriv_DA needed to perform a successful authentication toward the AAA server. These types of gating functionality may provide another type of logical binding between device validation and device authentication.

Generalized binding of device integrity validation to other essential device functions may be provided.

The concept of binding between device integrity validation and device authentication, as described above, may mean, in general, that the processes, input and/or intermediary data used, and/or the results, of device integrity validation may "gate" the procedure or process of authentication.

The concept of binding may be generalized with respect to both the type of device where binding may be implemented, and also with respect to the function of the device that may be bound to the process of device integrity validation. In the most general sense, binding may be generally considered to be implemented if there exists a device D that has a capability to check, report, and/or verify its own device integrity, either by itself or by performing an interactive process with an external entity and/or a capability to perform at least one function X that may be considered an essential function of the device. An essential function may be a function that, without it performing as intended, device X may not be considered to be operational in a normal, useful sense. An Example of an essential function for a device such as a mobile phone may include one or more of the following: ability to send a distress alarm, subscriber authentication (to the network), device authentication, core application, communication stack execution, user authentication (to the device), device management functions, transmission or reception of wireless signals, or device power supply and management functions.

Binding may be defined, and implemented, as a procedure where either data D_V, procedure P_V, or result R_V of device integrity validation process may indicate a unique and hard-or-impossible-to-fake-or-clone relationship between such D_V, P_V, and/or R_V toward a successful functioning of the essential function X. The three types of binding mechanisms that were described in the earlier sections may again be applied. Binding due to shared presence and use of cryptographic means, binding due to use of same or successive communication protocol packet, message, session, or sessions, and/or binding due to gating or conditional access to data D_X or a procedure P_X that may be essential for a successful functioning of an essential function X which may be conditioned upon a successful validation of the device D.

Figure 11:
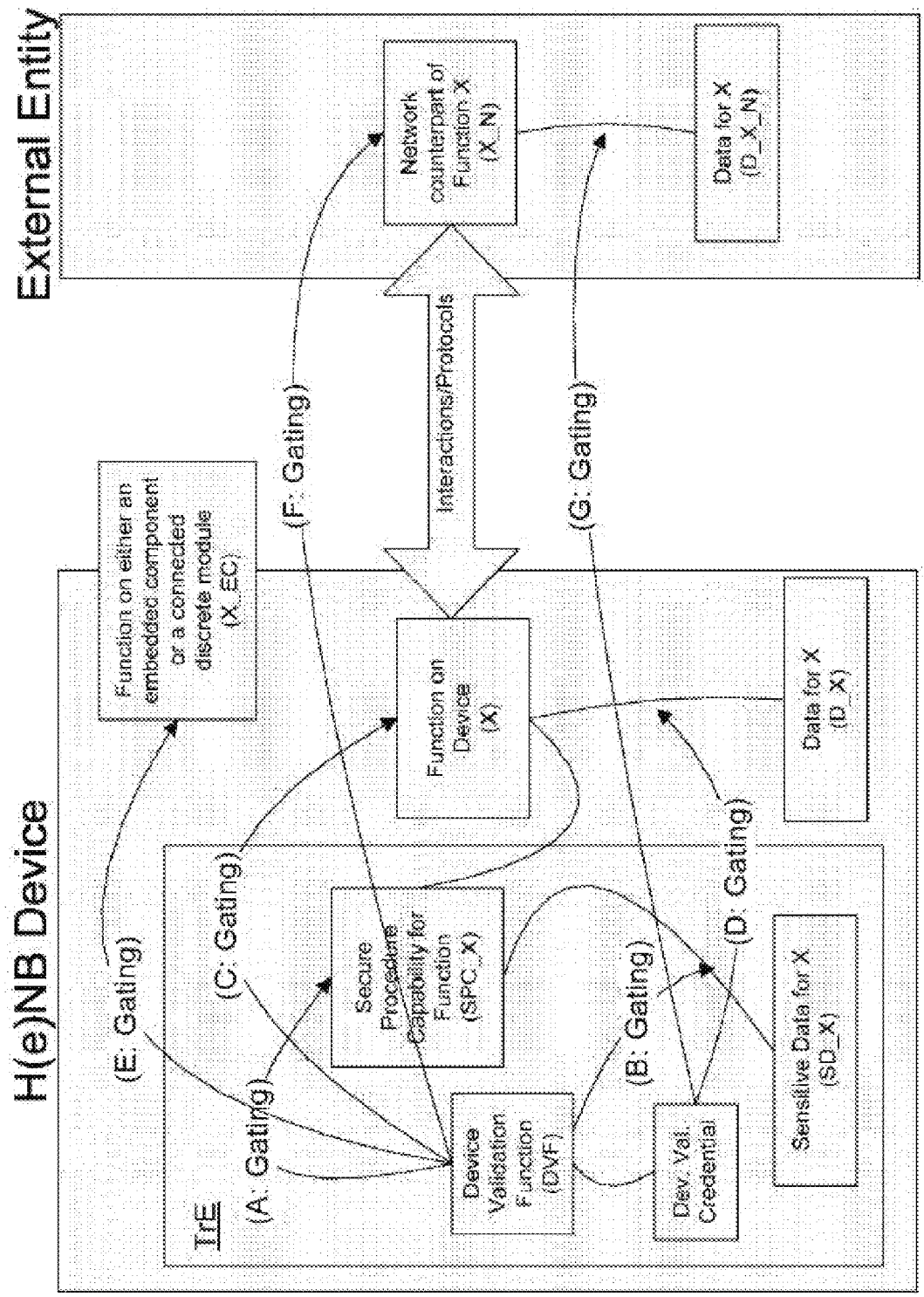
FIG. 11 illustrates an example of a binding using gating functions.

FIG. 11 is a diagram of an example where a second type of binding, i.e., the gating type of binding may be used between validation process (DVF) and function on device (X). A TrE may have within it a Secure Procedure Capability for Function X (SPC_X), and Sensitive Data required for function X (SD_X). The DVF may also gate the function on device (X) itself, as well as any data (D_X) on the non-TrE part of the Device needed by the function, function (X_EC) on a component/module embedded in or connected to the device D, and the network-based function (X_N) and data it may use (D_X_N).

FIG. 11 shows multiple types of gating (A to G), where the DVF, depending on the results of the device integrity validation, may gate the access to: A) the secure processing capability SPC_X, and/or B) the sensitive data SD_X inside the TRE that may be needed for function SPC_X, and/or C) any function on the device X that may be inside or outside of the TRE, and/or D) any data on the device that may be inside or outside of the TRE and needed by any function X, and/or E) any function X_EC on either an embedded component (for example, such as a SoC) in the device or a discrete module connected to the device (e.g. such as a UICC), and/or F) any function X_N performed by an external entity (i.e., from the network), and/or G) any data D_X_N needed by any such external function X_N.

Note that examples of procedure X may include such functions as communication functions, e.g., radio and baseband transmission and reception, Device Power management (including on/off), User-Interface, Media Processor Functions, GPS and other Location functions, Timer and Timing Synchronization functions, and communication functions such as WLAN, Bluetooth, Cellular Comms, high-level applications such as web functions, single sign-on and identify federation and management functions, voice and other media functions such as codec functions, gaming functions, and security procedures for them such as subscriber authentication, device authentication, authorization for applications, cryptographic operations including en/decryption and signing and signature verification, and any other function of the device.

SPC_X may include, but are not limited to, cryptographic en(de)cryption, signature generation or verification, random number generation or usage, timing synchronization and time-stamping, message authentication code generation and verification, cryptographic key generation, derivation, or management (including deprecation or quarantining), certificate verification, and computation of secret materials that are needed for authentication of the TRE, user of the device, the device itself, or subscriber and/or owner of the device, or authorization.

Examples of functions X_EC may include but are not limited to, data storage and handling functions, authentication functions, key generation and usage, en(de)cryption, signature generation and verification, configuration management, etc.

Examples of functions X_N may include, but are not limited to, data storage and handling functions, network-provide applications for such tasks as device management, provisioning, high-level applications (such as web access, etc.), DRM, voice and multimedia services and gaming functions, device management services, communication services, single sign-on and identify federation and management, etc.

The gating procedures may be performed as a cascade. That is, the DVF may gate access to one application, while that application could gate access to another application or data, etc. The DVF may gate multiple procedures or data, some or all of which may have causal or corresponding relationships.

Although features and elements may be described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

Systems, methods, and instrumentalities are disclosed to perform integrity validation of a network device. A network device may comprise a secure memory. For example, the secure memory may be included in a secure hardware module. The secure memory may receive a root key. For example, a root key may be received by the secure memory at a time of manufacture or a time of provisioning. The root key may be stored on the secure memory and may not be visible to software or hardware outside of the secure hardware module.

The secure hardware module may receive a first code measurement (a measurement of first code). For example, a processor such as a processor associated with the network device comprising the secure hardware module may select a first portion of code to measure. The first portion of code may be stored in a memory associated with the network device, e.g., ROM memory, RAM memory, etc. The processor may measure the selected first portion of code resulting in the first code measurement. The processor may provide the measurement to the secure hardware module.

The secure hardware module may generate a first key based on the root key and the first code measurement. For example, the secure hardware module may derive or release the first key. A generated first key is valid when the first code measurement is valid and is invalid when the first code measurement is invalid. For example, the secure hardware module may derive a first key based in part on the first code measurement. If the first code measurement is invalid, then the derived first key is also invalid. The generated first key may be generated by the secure hardware module in order to provide access to resources. Access to resources may be provided without a code measurement when the code is stored in the secure memory.

The first key may relate to a first stage of trust associated with a first function (e.g., one or more resources may be associated with the first function). Further, a first stakeholder may use the valid first key to access the first function. If the first key is not valid, the first stakeholder may not access the first function. That is, the secure hardware module may prevent access to the first function when the first code measurement is invalid.

The secure hardware module may receive a second code measurement (a measurement of second code). The secure hardware module may generate a second key based on the first key and the second code measurement. The second key may relate to a second stage of trust associated with a second function (e.g., one or more resources may be associated with the second function). Further, a second stakeholder may use the valid second key to access the second function. Key release may be limited to a last known good boot stage (e.g., a last known boot stage for which there was a successful authentication).

The generation and/or release of resources such as keys and functionalities based on integrity measurements of hardware, code, and/or data may provide authentication in stages. For example, a device may comprise several layers with each layer having its own authentication secret. Each authentication secret may correspond to a particular stakeholder in a layer of device capabilities such as manufacturer firmware, trusted execution code, operating system, and third party applications. As a further example, a valid first key may be associated with a valid authentication to a first boot stage. The valid first key may be used by a device manufacturer (e.g., a first stakeholder) to access firmware on the network device to perform remediation on the firmware. A valid second key may be associated with a valid authentication of one or more software components during a later boot stage (e.g., a middle boot stage). The valid second key may be used by a device manager (e.g., a second stakeholder) to access the software components, e.g., to perform remediation on the software. By providing valid keys for stages that have successfully authenticated, access may be granted commensurate with a last stage that did not fail authentication.

The number of stages in the disclosed multi-stage authentication may vary and is not limited. Further, multiple authentication paths may be provided. That is, authentication may branch in different ways at a given stage of integrity checking. For example, each stakeholder may provide one or more policies relating to one or more stages of authentication. At each stage, the authentication may branch in a different way based on stakeholder policies. A stakeholder may be able to manage its policies externally.

Figure 12:
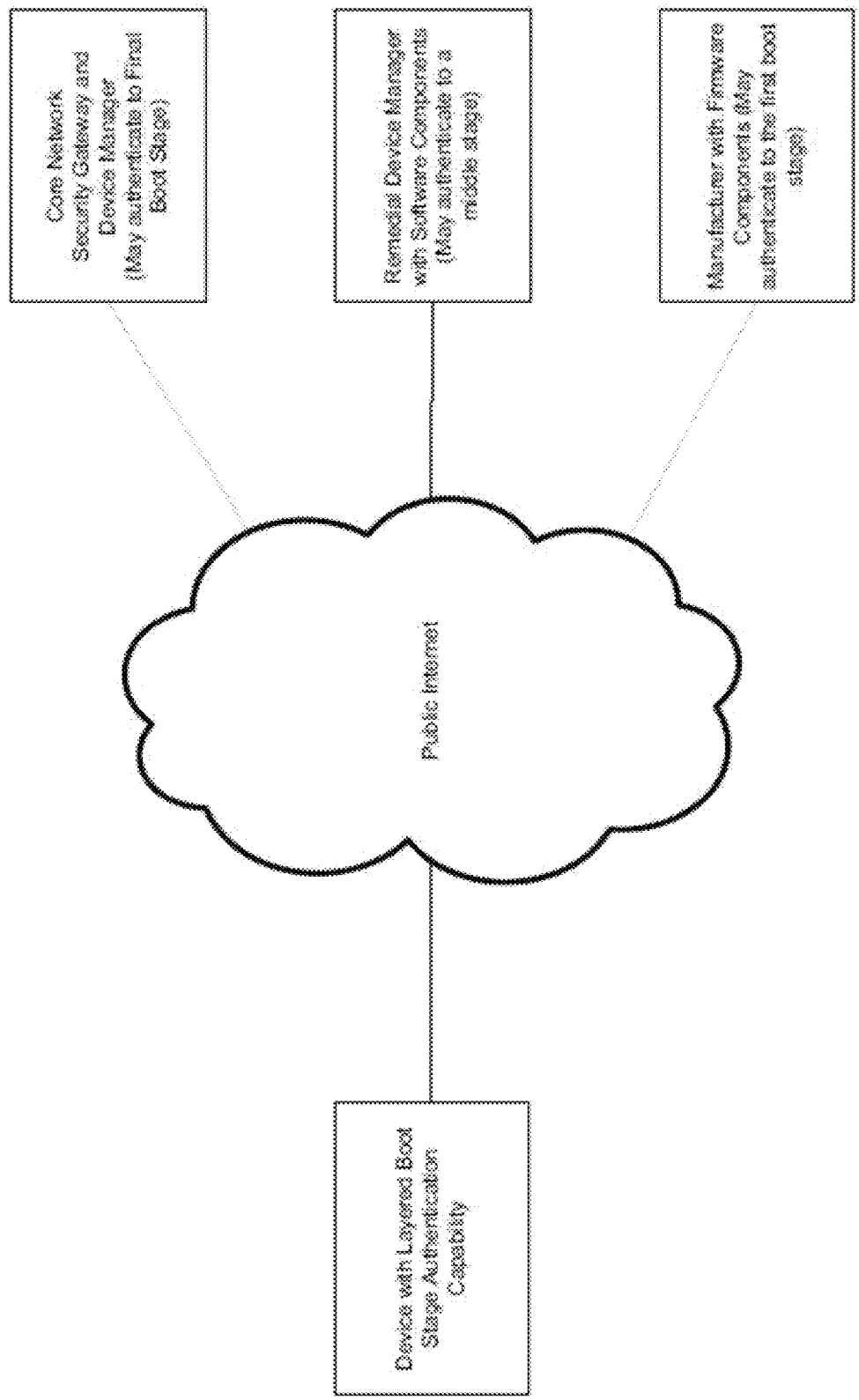
FIG. 12 illustrates an example of authenticating in multiple stages relating to an exemplary boot process.

FIG. 12 illustrates authentication in multiple stages relating to an exemplary boot process of Device 1200. Device 1200 may be configured with layered boot stage capability (e.g., to release one or more valid keys associated with one or more stage authentications). When Device 1200 authenticates to a first boot stage, Device 1200 may, at 1201, provide a valid first key to a first stakeholder, such as a manufacturer. The first boot stage may be a low level authentication, and, the key associated with the first boot stage may provide access that is limited to firmware associated with the manufacturer. When Device 1200 authenticates to a second boot stage, Device 1200 may, at 1202, provide a valid second key to a second stakeholder, such as a device manager. The second boot stage may be a later boot stage than the first boot stage, and, the key associated with the second boot stage may provide access that is limited to the authenticated software. When Device 1200 authenticates to a final boot stage, Device 1200 may, at 1203, provide a valid third key to a third stakeholder that may provide access to a core network, security gateway, etc.

Using the boot process as an example, access to restricted on-chip resources and authentication secrets for a last known good boot stage in the boot execution may be released. Such a staged release may allow for trusted device software/firmware remediation to the upper layer of code using the lower layer for a trusted remote device management update procedure to the device. This may rely on a chain of trust emanating from a secure immutable on-chip root of trust. As an example, upon reset, a particular chip configuration may be expected to release a first key. This configuration may ensure that the processor will jump to the proper internal execution code which may then begin gathering code to measure before the next stage in the chain of trust execution. If the initial chip configuration is not correct, such as the jump vector not being to internal ROM code for example, then the initial and subsequent integrity measurements may be different than expected and the device may not be able to proceed to the next valid stages.

Forms of control may include hardware anchored gating of on-chip resources, comparison of the measured integrity of component(s), and/or derivation of keys based upon the actual measured integrity of the system. In the latter case for example, the disclosed systems and methods may be used to generate multiple trusted control execution paths for other uses, since the resulting key may be different from what is needed for normal operations. So, as an example, an external entity may have direct control over a pin on the device which may result in a different boot sequence and therefore different keys that are also based on the root of trust.

Authentication may be provided, for example, by imposing two additional factors of authentication per boot level, in additional to conventional parameters. Authentication to an external entity may require the knowledge of 1) the boot stage-specific encrypted signing secret or ciphering key, which may be revealed if 2) the boot stage specific code is correct (passes the integrity check).

A resulting application may be that external entities may remotely validate the integrity of the device according to the functionality that is required by that entity. Additionally, an independent stakeholder (e.g., of the hardware or various firmware and software layers of a device or device manufacturer) may be assured that other entities may not be able to modify the independent stakeholder's corresponding firmware or software without disabling the device function.

An exemplary staged boot sequence may begin by detecting and utilizing the trusted hardware mechanisms to force cryptographic keys to unlock on-chip resources and provisioned secrets such as ciphering keys, signing keys and integrity measurements for the next stage in the boot process. As each stage is successfully checked, on-chip resources and new secrets and measurements may become available for use.

In some cases the information may be within a core trusted domain and may be made available for use by the hardware but not for viewing or possession by the software/firmware, and, on-chip resources and other information may be released into the execution environment as each stage of code base is checked and verified to be trustworthy (e.g., verified to be trustworthy based on a code check, data check, hardware check, etc.).

Each boot stage may have a need for privileges and controls corresponding to its place in the secure boot process. Having credentials generated exclusively for a stage may allow the controls to extend beyond the internals of the platform, e.g., for authentication to external entities.

As an example, in the case of device management and device authentication, a manufacturer may need to have the privilege to update firmware while a network operator may need to remediate or update software and/or configuration data, but not firmware. If a device passes the integrity check of the firmware but fails on the software, then the key available may be that which allows the network operator to authenticate the device in order to update the software. However, if the device fails the firmware check as well, then the key to authenticate the device to a management system may be released, but not the key required to authenticate to the network, meaning that the primitive process may be in place to remediate/install the firmware remotely and securely, such that the device may not be booted in an insecure manner, i.e., outside of the root of trust process. The firmware failure may trigger release of an alternate function to help with remediation (e.g., the authentication may take a different branch due to the failure). An advantage of providing a root of trust attestation may be that it may allow for remote management of the firmware trust code base of the device.

Different stakeholders such as operators and application providers may be allowed to use different keys, based on the 'trustworthiness' level of the system, as characterized by the result of the measurements during the boot sequence. This may mean that some operators or owners of the device may still allow the system to boot to a partially trusted but partially untrusted state, possibly in multiple stages. Even in such a state, the device may be required to generate and use certain cryptographic keys (for example, for the purpose of indicating to an external user about the state of the device, or, to provide security for applications that may still be allowed even under such a partially trusted state of the device). One option may be to generate and use a higher-strength key in the instance that higher-levels of trust may be established on the boot sequence, and to limit to use of relatively lower-strength keys if relatively lower-levels of trust are established based on the boot sequence result. Policies may be pre-provisioned and the root of trust may enforce the appropriate key strengths that may correspond to the level of trust that may be established. The generation and use of such multiple keys specific to different levels of trustworthiness may be useful when, even a sub-optimally trust-verified system may need to use cryptographic resources to send certain information to external parties, without requiring excessive levels of strength on the key that may be incongruent to the trustworthiness level of the booted system.

The derivation of different keys may be allowed based on different boot sequences and different code such that there may be more than one set of valid stages. The possible device unique secret keys resulting from different boot sequences may emanate from the same root of trust (which may use the same root key) and therefore be just as trustworthy but distinctly different and mutually exclusive, which may allow for the separation of roles (e.g. trusted test mode versus trusted normal operation).

Algorithm choices for key derivation and signing mechanisms may be provided. Enforcement of a particular algorithm for the next stage key derivation and/or current stage signature or authentication may be provided. These controls may reside in a dedicated control register field in the encrypted credential package such that, upon decryption, the field value may be inserted into a corresponding register in the boot stage authentication module, which may set enforcement controls. The boot stage authentication module may be a TrE.

Figure 13A:
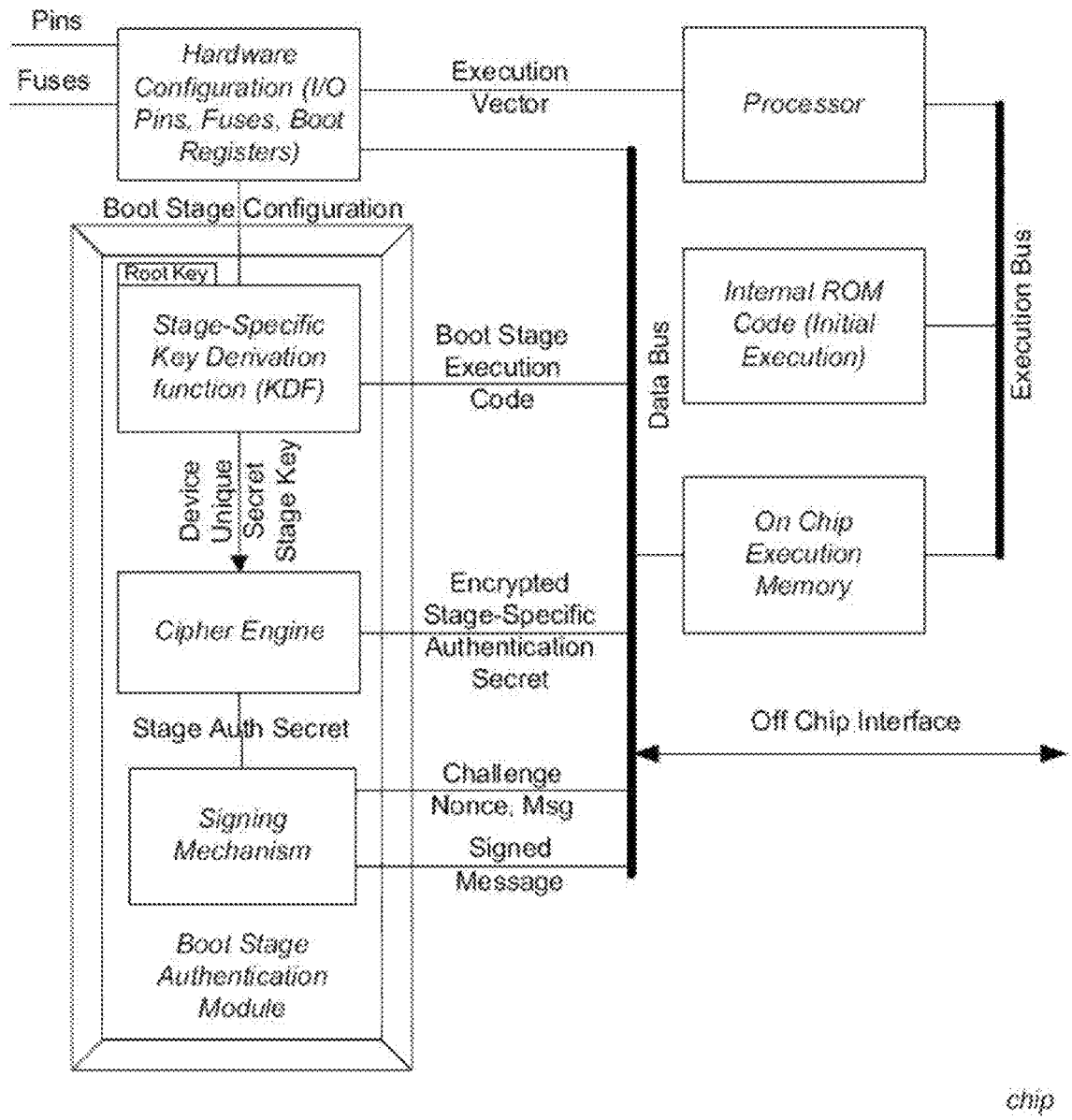
FIG. 13A illustrates an exemplary chip with which embodiments of the disclosed systems and methods may be implemented.
Figure 13B:
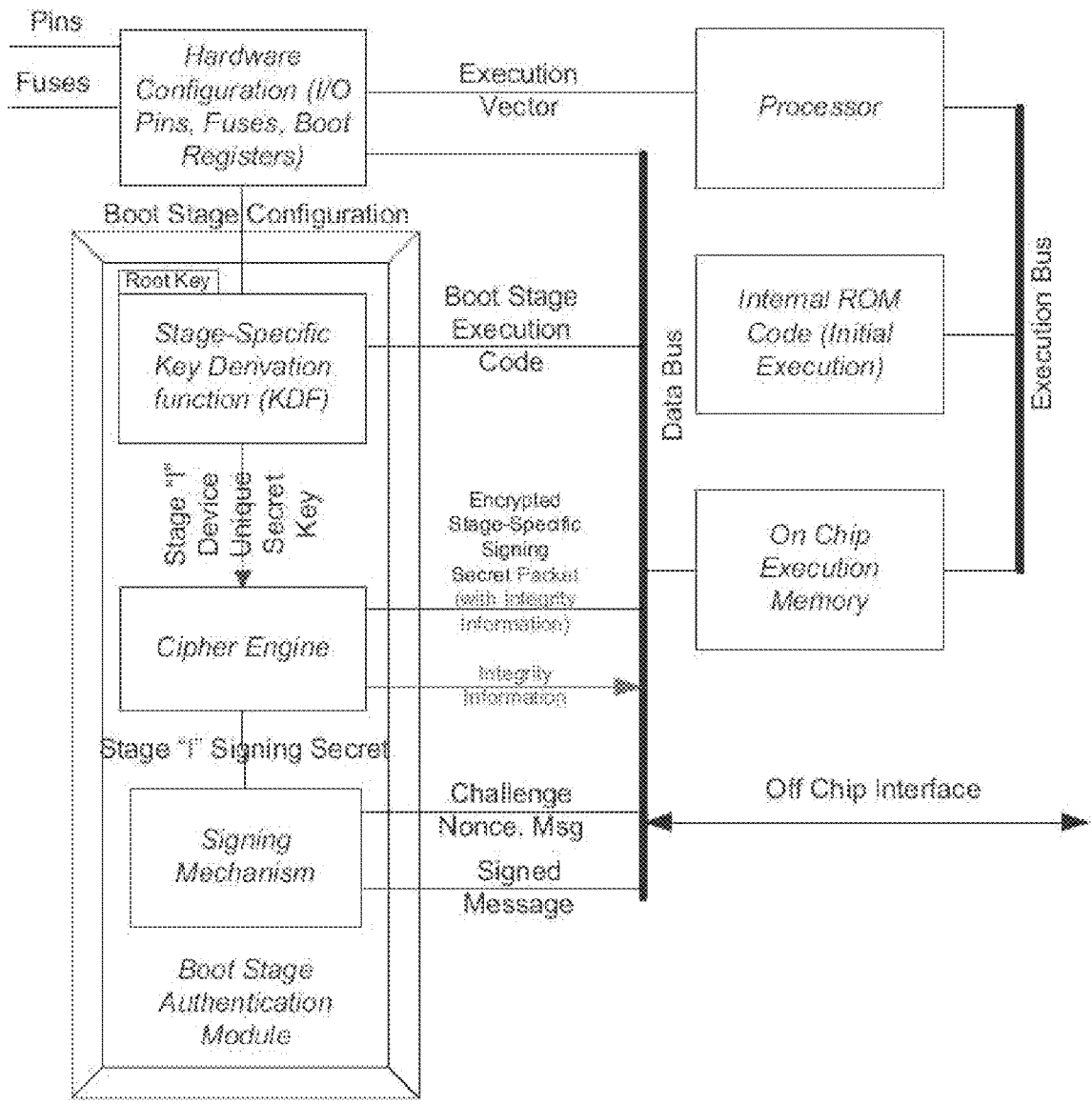
FIG. 13B illustrates an exemplary chip with which embodiments of the disclosed systems and methods may be implemented.
Figure 13C:
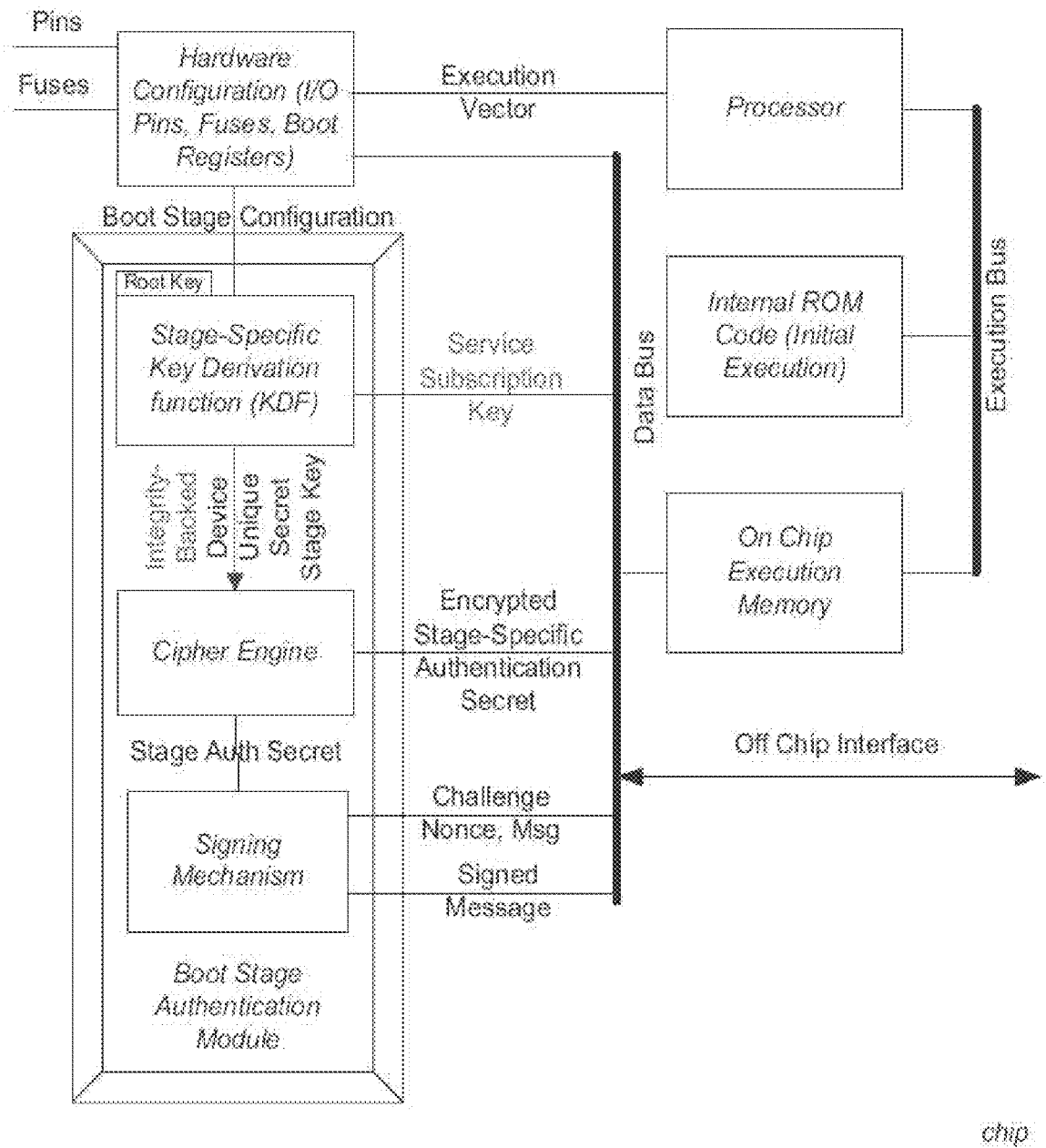
FIG. 13C illustrates an exemplary chip with which embodiments of the disclosed systems and methods may be implemented.

FIGS. 13A, 13B, and 13C illustrate an exemplary chip with which embodiments of the disclosed systems, methods, and instrumentalities may be implemented.

Secure multiple-stage boot authentication may be implemented, for example, in a secure hardware module, such as boot stage authentication module 1300. Boot stage authentication module 1300 may comprise four components: a root device unique secret key (root key), a control signal and stage specific key derivation function (KDF), a cipher engine, and a signing mechanism. Interfaces to the module may include configuration and data bus interfaces. The configuration register may enforce instruction and data flow such as the control of the MMU or boot execution vector, chip I/O, etc. The key paths may be protected from view by the software/firmware by being internal to boot stage authentication module 1300. The boot stage configuration interface may ensure that the chip is in the proper configuration to initiate a secure boot process.

If the secure boot process does not commence properly, for example, if the configuration is for an alternative boot sequence, then the resulting stage access to on-chip resources and device unique secret key may not come into existence, which may in-turn prevent progression to the next boot stage and the decryption of the signing key for that particular stage, and therefore, an external entity may not attest to the trust state of the device.

One or more of the following may be combined: a keyed cryptographic hashing algorithm, a device unique secret key, a feedback key path, and a signing mechanism. Layers of authentication secrets may be cryptographically bound to a particular device and the integrity of the measured information such as execution code and boot configuration controls. If measured information lacks integrity, then subsequent dependent layers of execution may not be able to access or decrypt the authentication secrets. For example, if the device does not have its processor jump vector set appropriately, does not boot internally, or is in a debug mode, then a difference in bit pattern may be detected, which may generate an incorrect key which may subsequently not authenticate to the external interested party.

A device may include a unique secret key. A device's unique secret key may be derived from the previous boot stage key and from the measured code. Since the device unique key may not exist on the device but may be generated from the code itself, if the code has been modified, then the device unique secret key may be incorrect. The root device unique secret key (root key) may be embedded in the device secretly at initial provisioning or at time of manufacture, and may be unique to the device. The root device unique secret key may not be available unless a specific device boot configuration is utilized. This root key may not be visible to software/firmware and may provide the seed for subsequent boot stage device unique keys, which may also not be visible to software/firmware, but may be utilized in an authentication or signing mechanism that may verify the key's existence and thus the integrity of the device to that stage in the boot sequence.

The root device unique secret key may be a key of adequate strength (e.g., today that may be about 256 bits) that may be configured during the manufacturing process, for example, as one-time-programmable fuses or in memory such that it may be secret and hidden from software/firmware, eavesdropping on chip signals, probing, simple and differential power analysis etc. It may be unique to the device, not be known by anyone, and seed the key derivation function initially upon reset.

Figure 14:
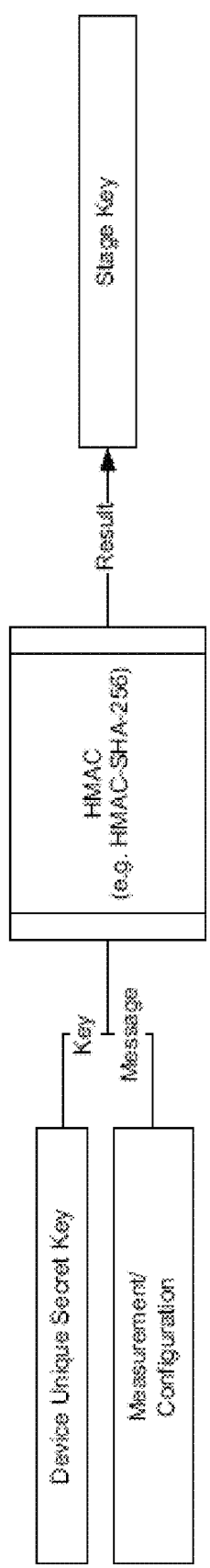
FIG. 14 illustrates exemplary key derivation functions.

FIG. 14 illustrates exemplary key derivation functions.

A key derivation function may serve two functions. It may generate the subsequent stage key and it may measure the subsequent boot code. It may be a keyed cryptographic hash function such as a HMAC-SHA-256, which because of its one-way property may ensure that obtaining a later stage key does not reveal any information about the earlier key and any bit error in the measured data may result in a largely different key that may have no correlation to the correct key. An encrypted stage-specific signing secret may be provided with integrity information. The integrity information may serve to validate a measured integrity check value of a component or function and to thus release the next stage of functionality.

Figure 15:
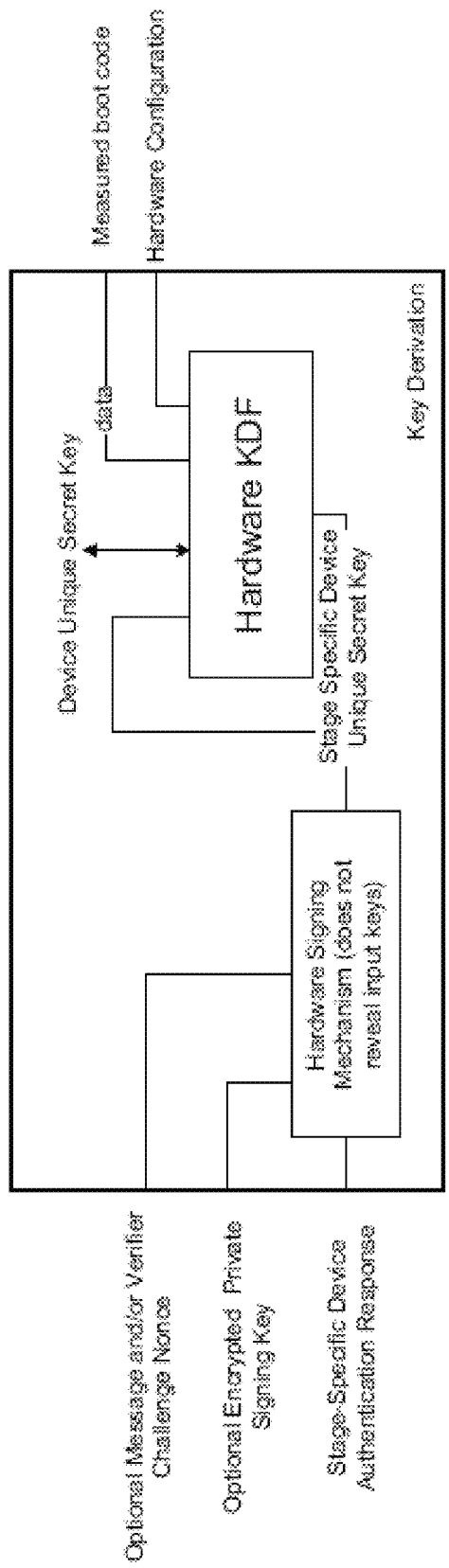
FIG. 15 illustrates exemplary key derivation details, including a signing mechanism.

FIG. 15 illustrates exemplary key derivation details, including a signing mechanism.

For robust device authentication, the key derivation function may generate a boot stage device unique secret key that may not be directly readable to on-chip software/firmware and external entities. Therefore the device unique key may be sent in a direct path to an authentication or signing mechanism. External entities and software may then provide the authentication or signing mechanism with challenge messages to validate the freshness of the boot state of the device through the off chip interface.

Figure 16:
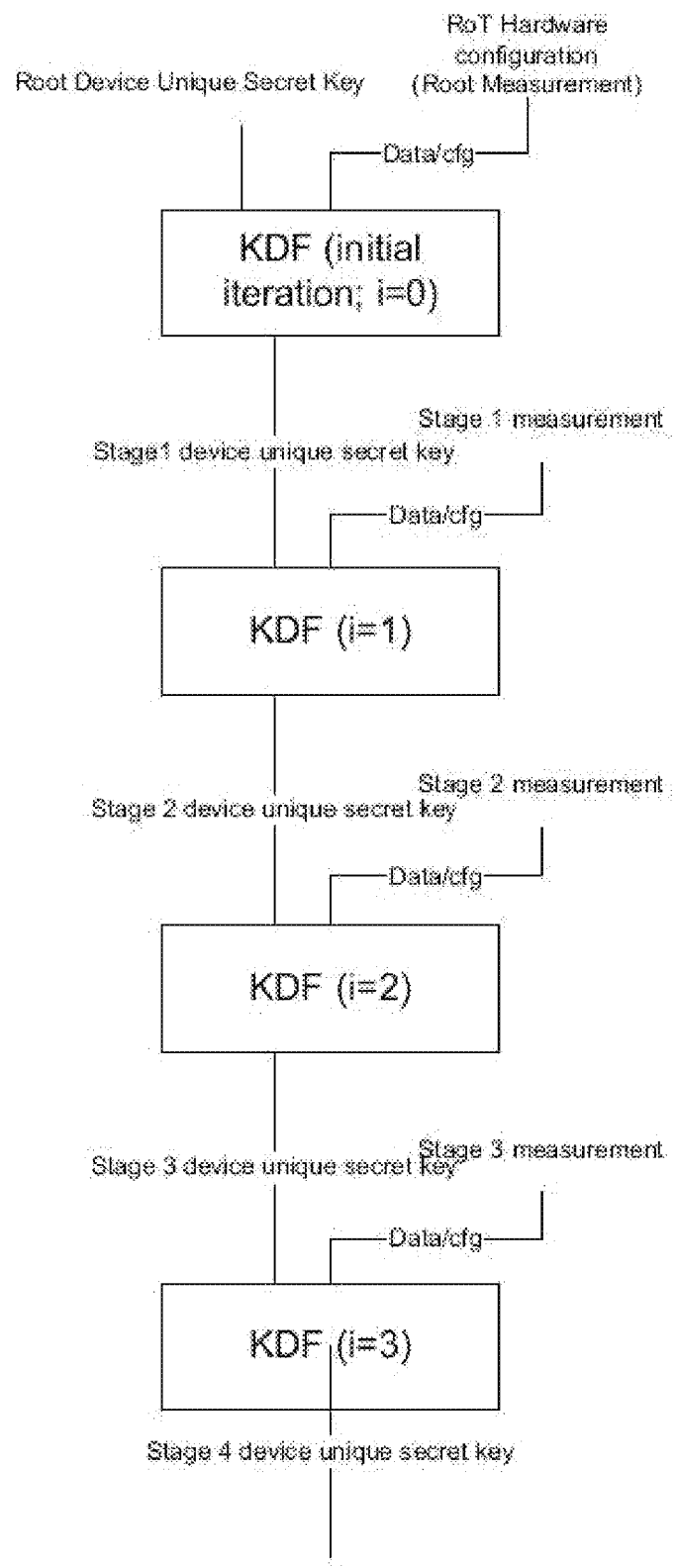
FIG. 16 illustrates exemplary multi-stage key derivation details.

FIG. 16 illustrates exemplary multi-stage key derivation details.

As the boot flow progresses from initial boot and program loader sequences to operating system and application loading, the integrity of each boot stage of code may be measured before it is executed. The code may be fed into the key derivation function at each stage and a device unique secret key may be generated at each stage. For example, initially the root device unique secret key (root key) and a first code measurement may be fed into the key derivation function, and, a first key (initial stage key) may be generated. This may be repeated for multiple stages until a last good credential is determined.

Figure 17:
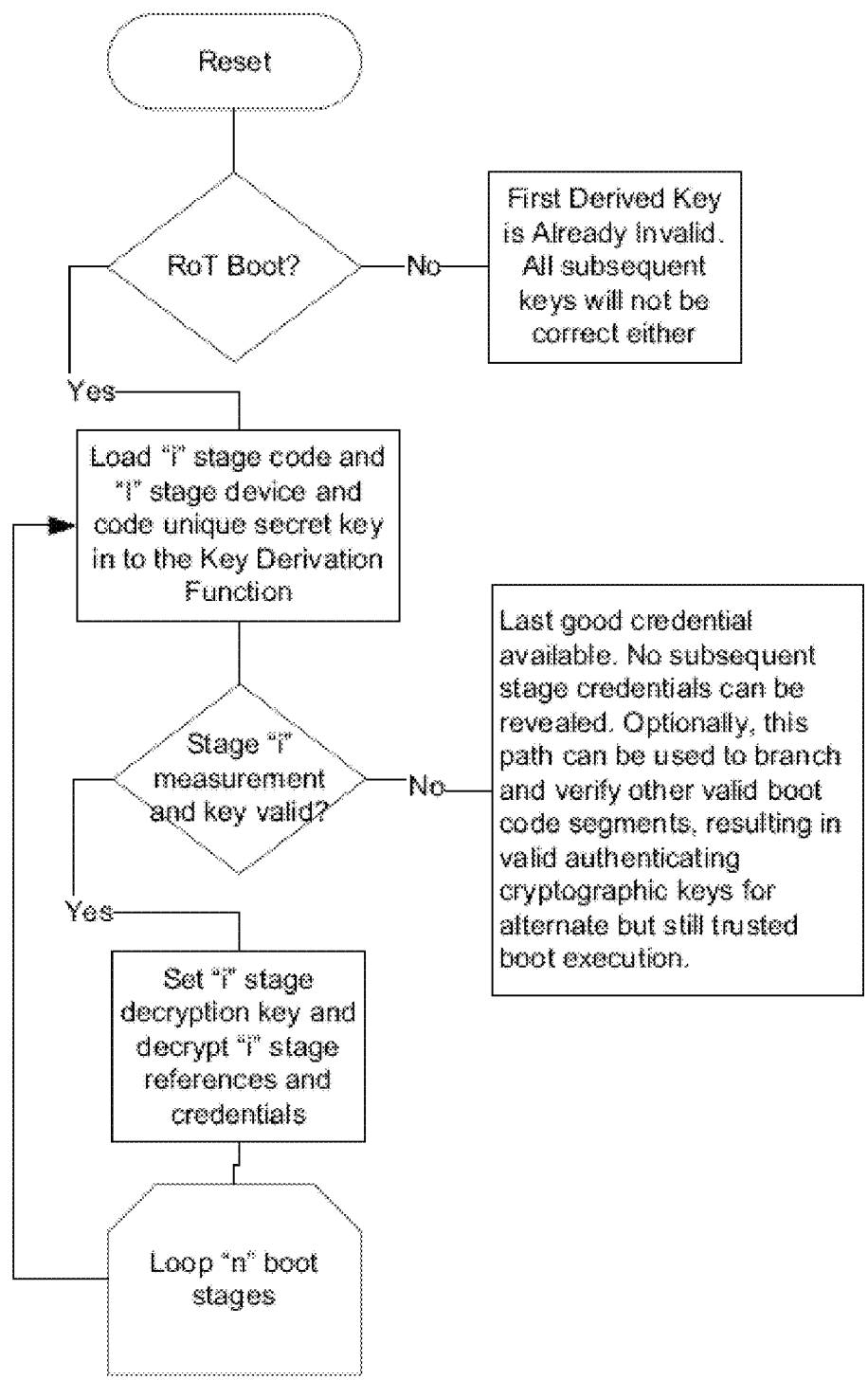
FIG. 17 illustrates an exemplary booting sequence.

FIG. 17 illustrates an exemplary booting sequence. The exemplary illustration of FIG. 16 shows how keys may be derived in multiple stages and how a last good credential may be determined. The initial stage key may verify that the hardware is configured for the root of trust execution e.g., that the processor vectors to internal ROM, hardware integrity test results may be correct, and that security sensitive I/O pins are set properly e.g., not in a test mode.

If boot stages are executed according to proper boot configuration(s) and code, then a final result may be a ciphering or signing key which may be used externally by a network entity to verify the device has booted in a trustworthy manner. Otherwise, if a stage boot code fails, then the final signing key may be incorrect leading to a failure to authenticate externally/remotely.

The chain of execution may not need to track a chain of signing keys. The boot sequence may pass execution control to a checking sequence (e.g., hardware based) which may load the code measurements needed for the trustworthy operation of a device. If the measurements are correct, then the result may be a final key that may be used to validate the trustworthy operation of the device externally.

Keys and controls derived from a valid boot stage may unlock residual ciphering or signing keys that persist into the run-time operation. A device management server may use this residual signing key to verify that a device has securely booted to a trustworthy state to determine if the server may safely download application code. On the other hand, removing access to keys at each boot stage may help to maintain privileged control over hardware protected domains of the chip that should be accessible to a specific vendor of a specific boot stage code, e.g., for purposes of authorized device personalization, provisioning, debugging, testing, etc.

The executing boot code may need to detect that an integrity failure has taken place on the next stage measurement. For example, embedded in the encrypted secret packet for the next boot stage may be an indication of an integrity failure such as a known "integrity indication message" located in a specific field of the encrypted secret packet. An error in the next boot stage measurement may result in a garbled integrity indication message in the packet's field, which may not match the expected value, indicating to the executing boot code that an integrity failure has occurred.

A hardware comparator in the boot stage authentication module (see e.g., FIGS. 13A-C) may detect matches between the (HW protected, invisible to software or firmware) expected and resulting integrity values in order to generate a hardware control signal to control access, e.g., to integrity-dependent hardware configurations, chip secrets, fuses, I/O and test pins, LEDs, etc.

The controlling boot sequence may then choose to issue an alert out of the chip, indicating to the external world that a failure has occurred. Or, the controlling boot code may remain idle, awaiting input from the chip interface (network or pin) to attempt to authenticate to the external entity.

In one operation, the boot stage authentication module may decrypt the encrypted stage signing secret (packet). However, there may need to be a way to encrypt and install the stage signing secrets. The module may have a "provisioning mode" input signal, an "authorized access not allowed" input signal, and a "authorized stage" input signal that may be 1) locked out by one-time-programmable fuses for manufacturing-stage-only provision methods, and/or 2) made accessible by authorizing hardware on the chip.

The chip may need to provide another mechanism to protect the inputs if they are not locked by fuses in the manufacturing process. If they are not locked down by a fuse, the boot stage authentication module may allow provisioning mode if the device has booted securely by its own detection mechanism as described herein. This may prevent non-secure boot code from entering provisioning mode. However, it may be up to the secure boot code, hardware configuration, and other "authorization" hardware on the chip to protect against unauthorized access to the provisioning mode inputs. In other words, the boot stage authentication module may assure that secure boot code is executed to protect the boot code authorization sequence that manages the authorization hardware that protects access to provision mode. In an embodiment, the secure boot process may utilize bound keys (e.g., public, private, etc.) and a challenge response protocol to authenticate and authorize claimants to have access to the provisioning process and the provisioning mode input.

The provisioning mode inputs may allow the subsequent stages of signing secret packets to be decrypted and stored internal to the boot stage authentication module in protected registers unavailable to software and not visible to the provisioner. Then, the provisioning mode state may be switched to encryption mode. The new boot stage code may be loaded into the key derivation function. When the code is loaded, a new device unique secret key may be automatically generated (but not visible to the user or the software). Then, the new signing secret corresponding to the new boot code may be inserted into the cipher engine and encrypted with the new device unique secret key. The result may be stored in a location to replace the previous version.

Subsequent boot stage code may be loaded that derives new subsequent device unique secret keys, which may be used to encrypt the internally stored subsequent stage signing key secrets. This process may continue until completion. The device may reboot with the new boot stage code and its corresponding signing key. Subsequent boot stage code and keys may remain the same, unknown and bound to the new chain of stage device unique secret keys. Boot stages prior to the modified stage may remain unmodified.

Figure 18:
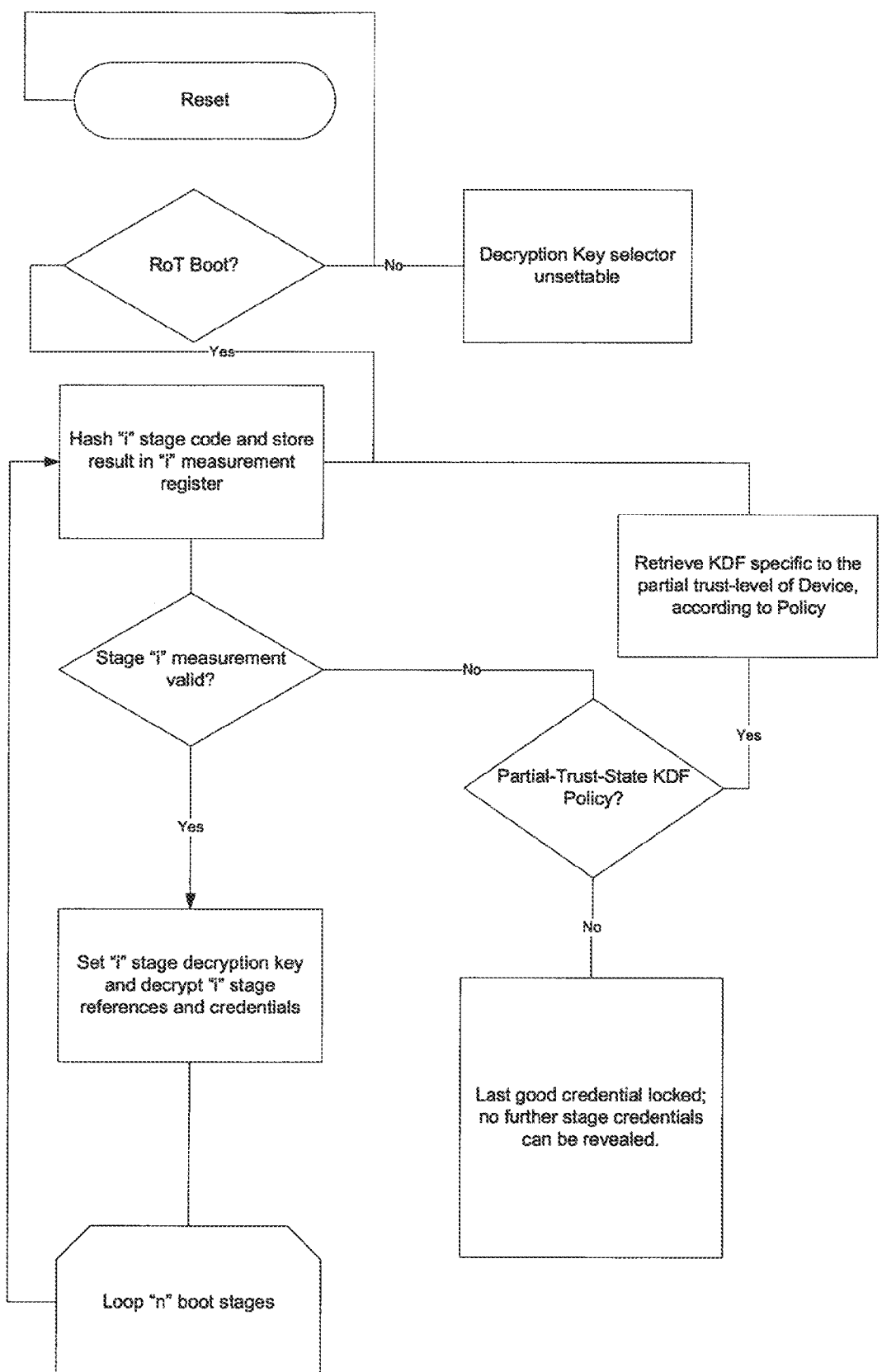
FIG. 18 illustrates an exemplary boot sequence flow.

FIG. 18 illustrates an exemplary boot sequence flow for a device that generates and uses keys whose strength (or other strength-of-security characteristics such as crypto algorithm itself, or mode of the algorithm, etc.) may depend on the result of the level of trustworthiness of the system as evidenced by the integrity checking procedure performed during the boot sequence.

The disclosed systems and methods may be used in a single stakeholder (e.g., a remote user) embodiment, which may provide a single stakeholder the flexibility to manage a device securely under varying degrees of functionality. For example, a remote user may want to validate if a device has correctly obtained its full level of device integrity and/or functionality before using the device for security critical and complex functions.

To determine a level of device integrity and/or functionality achieved, a user may challenge the device by submitting a nonce to the device and subsequently retrieving the signed response (e.g., the nonce may assure the freshness of the result). The user may then check the response to determine to what stage of integrity and health check execution the device has passed. Based on the result, the user may have assurances that he may securely interact with the device for the function(s) for which integrity have been verified.

As an example, if the response represents that no secure boot process (e.g., no integrity checks) occurred, then the user may know the device is configured in a non-secure manner and may not be relied up on for the handling of sensitive data. Also, because some device integrity bound keys may be unavailable, encrypted data bound to a secure boot process may also be unavailable.

If a first stage of the process is achieved, then the device may have some security capabilities such as the ability to attest to some of its own failed functions and send out a replay protected and/or signed distress signal. The remote user may determine from such signal that the received distress signal is not false and/or spoofed by some other device, and, may take action to remediate the device knowing that the device sent the distress signal.

Continuing the example, if a second stage is achieved, then a new set of authentication keys representing a greater level of capabilities/device integrity may be available on the device that may allow for the user to remotely and securely modify failing code on the device. A variant of this may be where the device that achieves such a second stage of integrity may get local access to keys that may allow it to authenticate to the OAM or device management (DM) server (or such server application) of the remote user. At this stage in this example, the device may have the capability to authenticate the remote user (or his OAM or DM server or such server application) so some data and code on the device may be loaded and signed using available keys relating to the stage of integrity achieved. Other stages associated with other levels of capabilities may also be achieved.

A final successful stage may represent that the device is fully capable to perform functions that the remote user may need to securely access and use.

The invention need not include several stages of functionality and is not limited to either one or multiple stakeholders. In one form, the device may perform a single stage of checking with a single representative result that results in a single authentication key for an autonomous validation from the remote users' perspective. This may be used to validate a device that attempts to attach to a network for example. The disclosed systems and methods may also be extensible to allow for flexibility in the representation of the trustworthy states of the device, to allow for distress indication, device monitoring, device management functions (diagnostics and remediation) and authentication procedures at device, service, and/or application levels.

Other authentication information, such as authentication keys needed for different purposes than a primary key needed for device's access to a preferred network, may be bound to the integrity checking process. Examples of such 'other authentication' may be authentication for OAM, authentication for application-level services, or authentication for security protocols (such as IPsec or TLS) at layers other than the access layer. Other examples may include authentication of the device and/or its profile (e.g. a group membership, etc), subscriber/user, service(s), or application(s). For example, referring to FIG. 13C, a service subscription key may be sent to the KDF. The resulting key may be a device unique secret key that may be used for authentication to a service provider. A challenge to the device may authenticate both the subscriber and the device integrity. In such a case, the service subscription key may be added at an appropriate stage. In an embodiment, the integrity-backed subscription key is provided at an early stage, while an integrity-backed application key is provided at a later stage. Other information may be combined at the KDF inputs to ensure binding to necessary information. By binding other authentication information into the integrity checking process, more than one independent source of authentication may be provided.

The disclosed systems, methods, and instrumentalities may allow for a dynamic extension of trust to allow for secure and remote configuration of devices. For example, out of the factory the device may boot securely to a known unconfigured state. Such a device may first use credentials included in a vendor certificate. The authentication keys available at this stage may allow an external management entity (such as a OAM or DM server) to remotely access a configuration data structure on the device, and allow the authenticated external management entity to insert new credentials (e.g., new signing keys or operator's certificate that may include the new signing key, etc.). Such new credentials may be protected using the methods described herein. New configuration data may be signed with the new keys and a new execution stage may be inserted, which may also be signed by the successful stage keys. Authentication keys may be added, which may be protected by the successful completion of this final configuration check. If the device is reset, for example, it may automatically reboot through to a new stage that may check the new configuration data. If the new configuration data matches, then the resulting authentication key may be available. An external entity may then authenticate the device. If the authentication passes, then the external entity may be assured that the device is properly configured.

Figure 19:
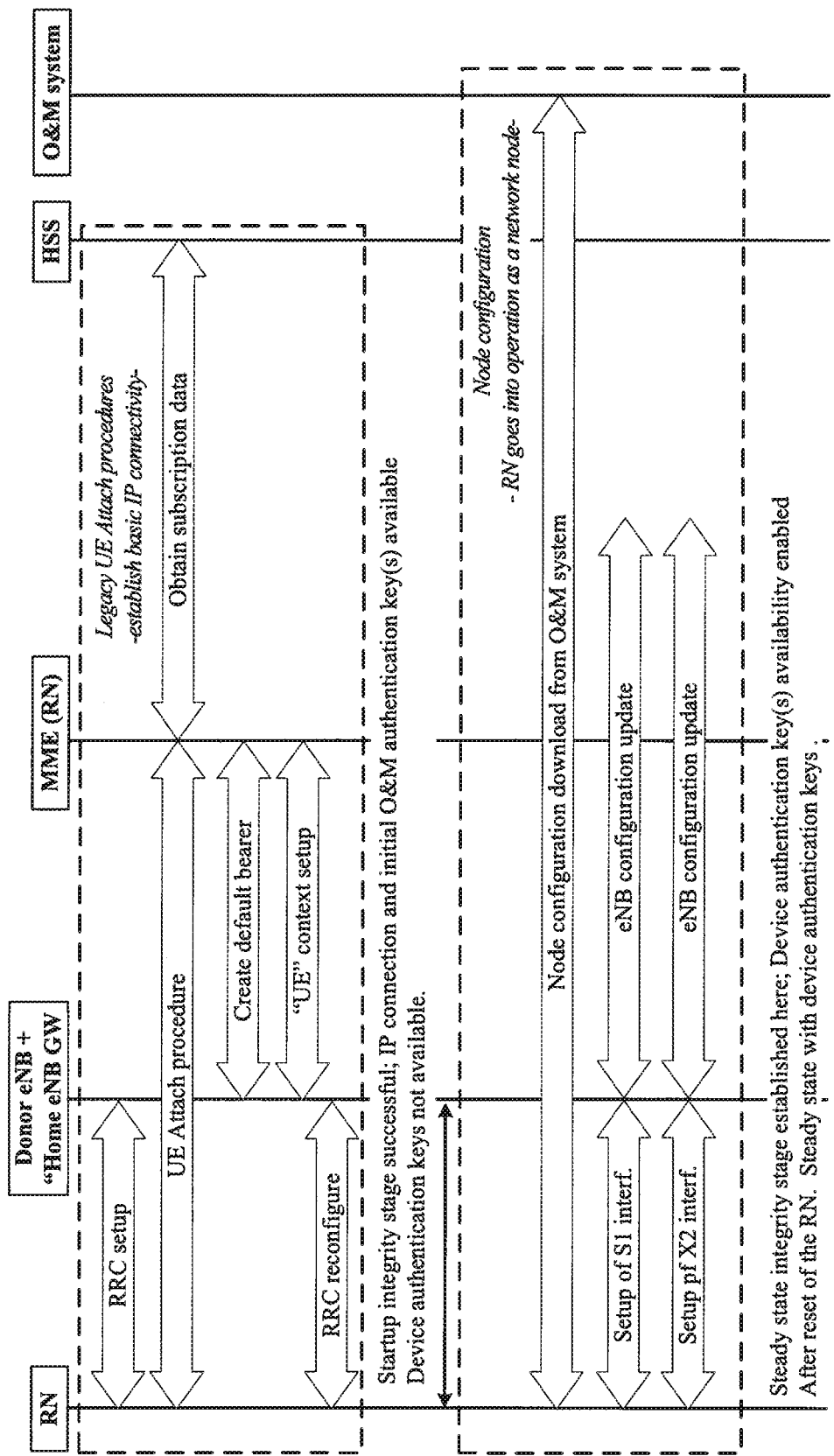
FIG. 19 illustrates exemplary network communications relating to multi-stage authentication.

FIG. 19 illustrates exemplary network communications relating to multi-stage authentication.

A 3GPP Relay Node (RN) may act as both a UE (i.e. Relay-UE) to a donor eNB (DeNB) as well as an eNB (i.e. Relay-eNB) to UEs that connect to it. Since Relay Nodes may be deployed on site in use scenarios such as emergency response or temporary coverage-gap filling missions, they may not be fully configured at deployment time and may not have all functionality to operate fully. Since the RN is a network device, however, security requirements, including device security requirements, may need to be high, resulting in a need for integrity checks that allow achievement of staged operational status. Such staged operational status may be needed for post-deployment configuration and credential enrollment.

Figure 20:
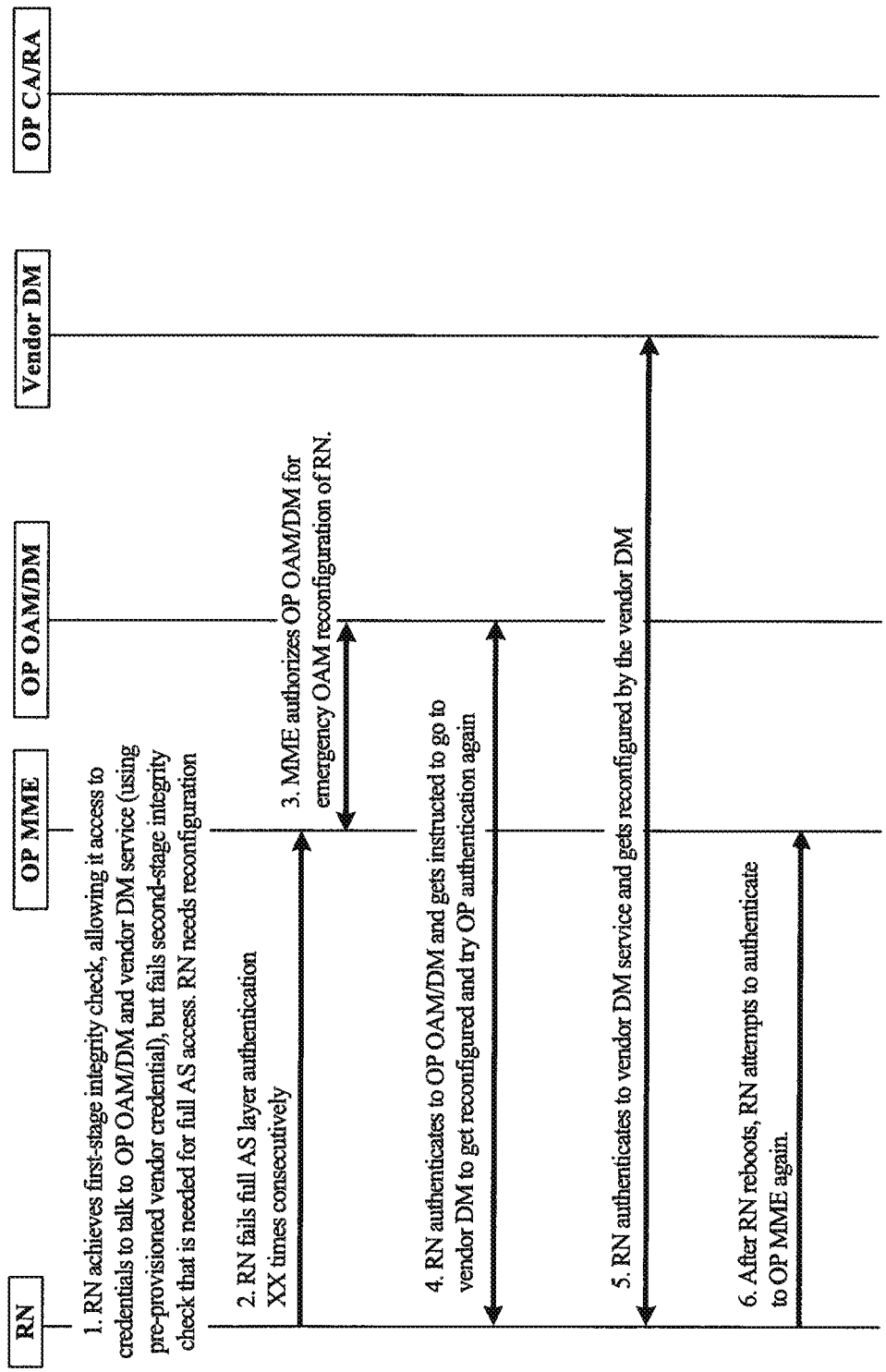
FIG. 20 illustrates exemplary start-up and post-start-up configuration procedures.

FIG. 20 illustrates exemplary start-up and post-start-up configuration procedures that also include multistage authentication and credential configuration using an exemplary 3GPP Relay Node.

In this example, the RN, if it passes certain stage(s) of integrity, is made capable of accessing a known Operator (OP) management box (e.g., OAM or DM server box, etc.) as well as a vendor's OAM/DM server. If the RN fails further stages, however, it may not be allowed to access credentials (that may or may not exist already on the RN) needed for full access to OP Mobility Management Entity (MME). Therefore, the RN may fail full-access authentication attempts to OP MME. With several consecutive such failures, however, the RN may be restricted to authenticate to the known OP OAM/DM, and may be instructed to get reconfigured by the vendor OAM/DM using preprovisioned vendor credentials. If it gets reconfigured and then passes the further stages of integrity checking, the RN may now get access to the credentials needed to access OP MME.

Figure 21:
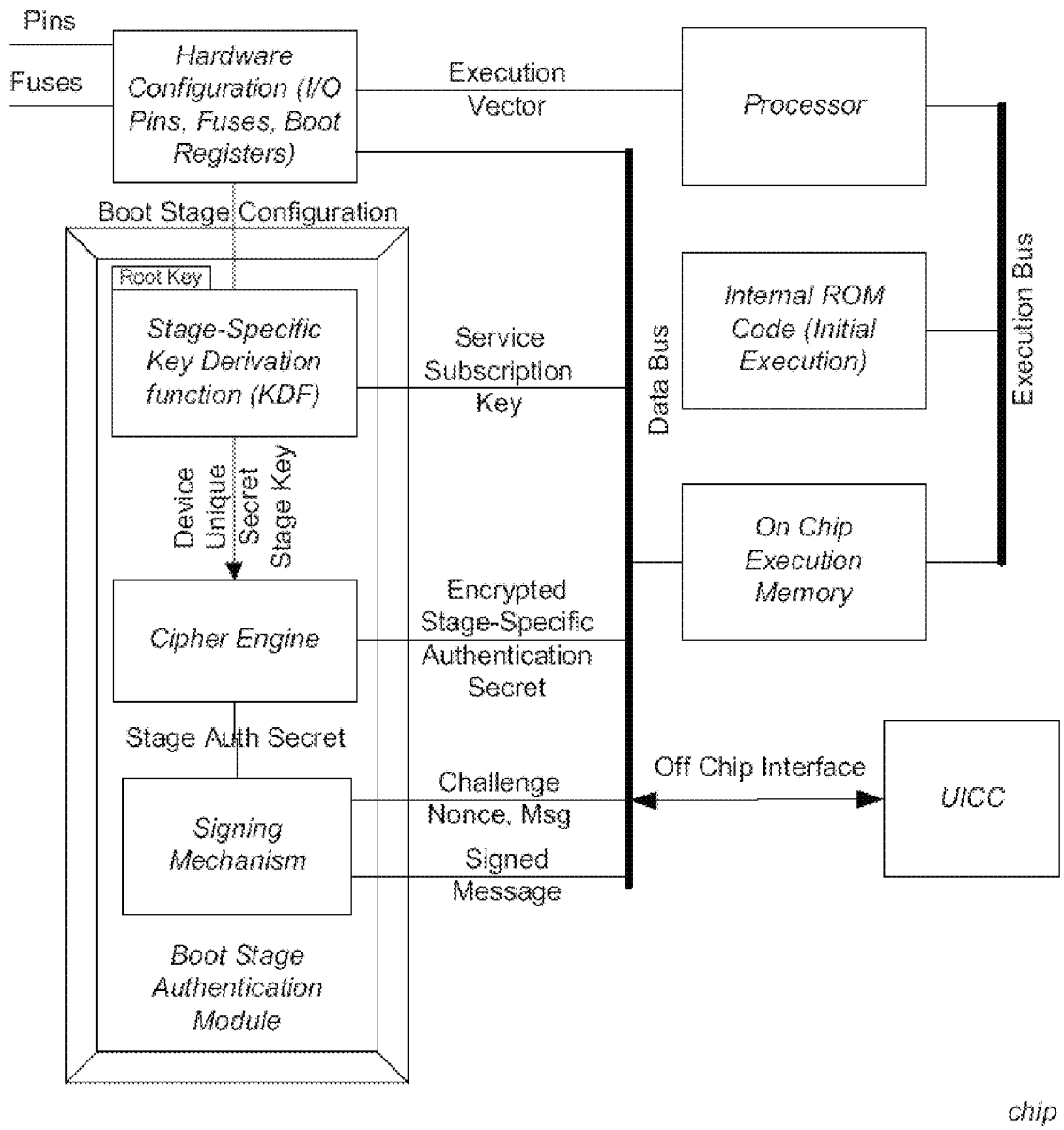
FIG. 21 illustrates an exemplary chip with which embodiments of the disclosed systems and methods may be implemented.

The disclosed systems and methods may be made sensitive to tampering and runtime failures. A separate tampering monitoring process may be established before or when the integrity of the device has been established (e.g., the monitoring process is chained to the root of trust). This monitor may check code, ports, or anything that may indicate an intrusion or tampering event. Upon such event, the value of the established device unique secret key is automatically removed, making authentication keys unavailable. See FIG. 21, which illustrates an exemplary chip with which embodiments of the disclosed systems and methods may be implemented. Attempts to reestablish a secure connection with the device using the integrity-based authentication keys may fail. This may provide continuous protection for external entities that rely upon the security of the device.

Figure 22:
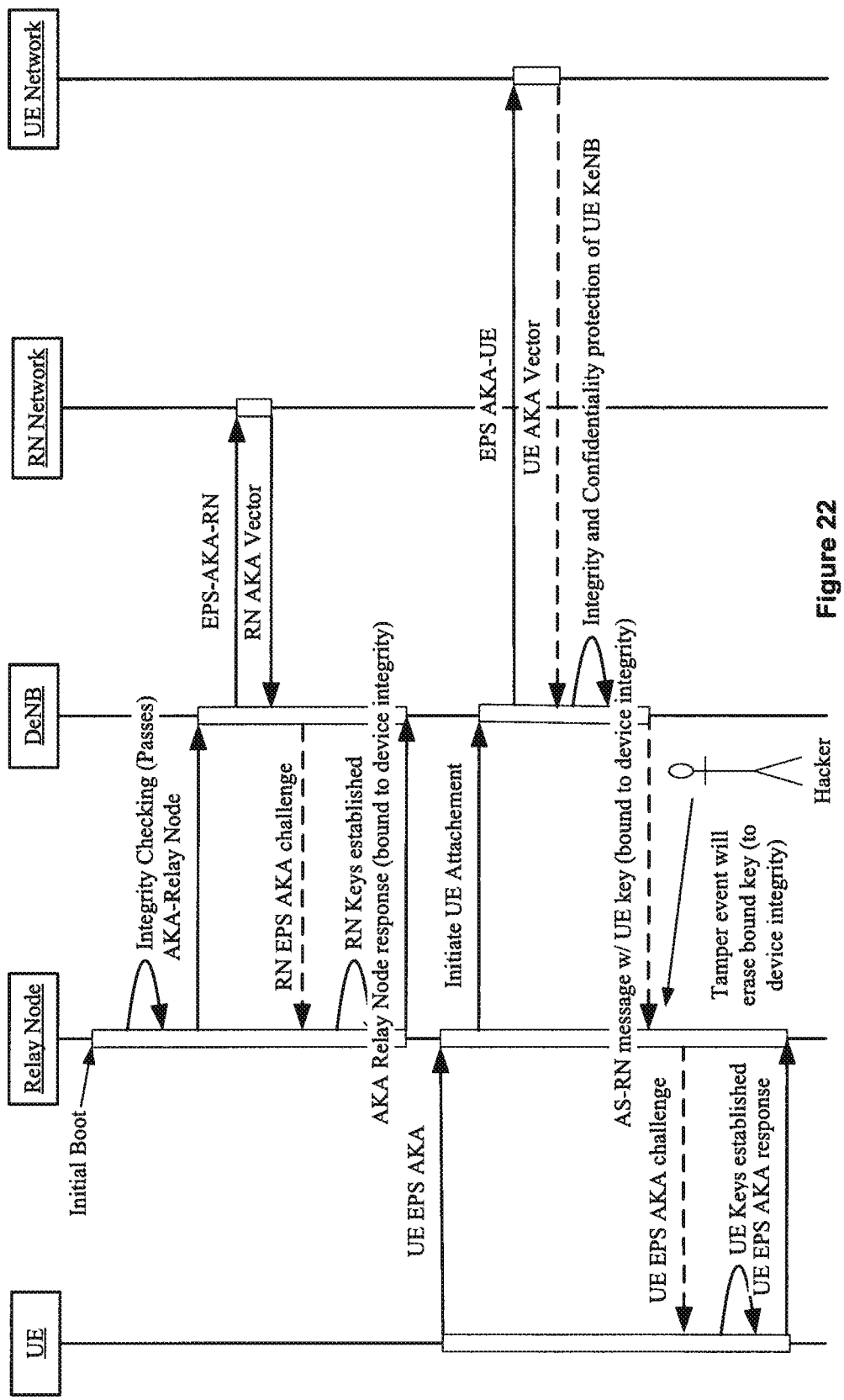
FIG. 22 illustrates an example of extending the integrity checking process to UE communication.

FIG. 22 shows how the integrity checking process may be extended to UE communication. The network may pass a UE key to the relay node using the integrity bound authentication key. If the relay node is no longer secured due to an integrity or tamper event, the relay node may not be able to decrypt the encrypted keys and the security of the communication from the UE is maintained.

The disclosed systems and methods may provide one or more of the following: a mechanism for the staging of device signing keys which may allow for the partial or staged remote determination of the trustworthiness of a device; a method for the staged release of on-chip resources and authentication secrets where the successful measurement of the code for the current boot stage of a device, the configuration information, and state of the secure boot process may be used to directly derive control signals, which may allow further access to on-chip resources and release secrets for authentication; enablement of trustworthy reporting, management, and remediation between external entities and a device that may be partially failing; elimination of a need for an explicit integrity checking procedure during the boot process and eliminate the need to store and protect boot code reference values; or, authenticated access to various stakeholders across a public interface such as a chip boundary or public internet.

A Platform Integrity Policy Engine (PIPE) may be part of the overall platform trust system architecture. The PIPE may control the multi-stage authentication and key release process. The PIPE may control various functions including flow of the secure boot process, processing of integrity check measurements on software and/or data components, subsequent enforcement actions according to policies, and/or flow of subsequent software load control. The policies may be defined by one or more external stakeholders such as a manufacturer and/or operator and may be provisioned on the device and updated in the field through remote update procedures.

The PIPE may control the risk of compromised software functionality from being loaded through controlled software and data check and load operations by progressively installing more and more functional capabilities and maintaining the dynamic loading of components during run time. As an illustrative example, depending upon the stage of progress in the loading operations, the PIPE may implement, in response to an authentication failure, one or more of the following: power down of the platform; prevent loading of compromised component(s) or quarantine the component(s); trigger alarms to external entities such as the security gateway or remediation manager in the network to notify a low level failure or compromised functionality; prevent access to functions or secure information on the platform such as authentication keys, etc.; or, prevent access to secure functions on the platform such as authentication algorithms, etc.

In some cases failure may be so severe that even the trusted environment may not be able to assure trust in the platform because the core TrE functionality has been compromised. Failure at a low level may trigger rudimentary operations such as generating a default root-of-trust signed alarm message, which may include integrity and replay protection and confidentiality protection. That is, upon occurrence of a low level security failure, a distress message may be released to the network by one or more communication channels that may be available.

As the loaded functionality is built and becomes more and more sophisticated, the device may perform more sophisticated actions such as acting as a secure and trustworthy proxy on behalf of the network entity, which may facilitate interrogative procedures to diagnose, report and/or replace compromised software and/or configuration data; perform bulk code or data reload/update procedures or investigate in greater detail, including integrity checking with a finer granular detail, a component suspected of tampering, to isolate the location of the fault in the component.

Varying access to resources on the platform may be provided (e.g., by the PIPE) depending upon the level of successfully verified functionality. If a component integrity check fails then it may not be trusted. This detected failure may be securely marked and indicated to the network (either explicitly or implicitly), and, the boot flow may branch due to this failed condition. This type of integrity check failure may be referred to as an execution flow failure, whereby the checked component may not be trustworthy and starting this component may result in the execution of malicious, compromised, faulty or misconfigured code and which may cause the device to perform functions in an unspecified and unexpected manner. Thus, the loading of new components and the available functionality may be affected by the integrity of components loaded previously.

As a result, the execution environment may change depending on the controlling execution process and access privileges at each boot stage and each runtime process. For example, at each stage in the boot process, decisions may need to be made based on the integrity measurements made at that time. Subsequent stages and policies may use information passed from previous stages through any available secured means of information conveyance or storage that transcends the execution stages (states, variable, parameters, registers, files, etc.) to determine its own operations. For example, an upper layer application authentication function may use information on the integrity of previously loaded components to determine its own operations including gating of the release of keys necessary for successful authentication with an external entity.

An exemplary PIPE functional flow may include one or more of the following. The RoT may be checked and its integrity may be verified. The baseline TrE may be checked by the RoT and its integrity may be verified. If there is a failure in the TrE check, then one or more of the following may be implemented: prevent release of keys necessary for attachment to network; trigger an alarm to network (a fallback code may be loaded which may enable the alarm to be sent to the network and/or the alarm may trigger a remote bulk update procedure to replace the TrE); or, power down the device. Basic communications connectivity code may be loaded, which may include one or more of the following: check and load baseline operating system modules; check and load baseline management client; or, check and load communications modules. If a failure occurs, then one or more of the following may be implemented: prevent release of keys necessary for attachment to network; trigger, via an alarm, remote bulk update procedure to replace components (a fallback code may be loaded which may enable the alarm to be sent to the network and/or an alarm may trigger a remote bulk update procedure to replace basic code); initiate alarm and remote component update procedure; or power down device. Check and load remaining operating system and management client components. Check and load dynamic, re-locatable and/or reloadable functional modules, and if there is a failure, one or more of the following may be implemented: prevent release of keys necessary for attachment to network; send failure report in protocol to network (failure report may indicate failed components that may be updated remotely by network); send alarm and request remote component update procedure; or power down device.

The action of the PIPE may vary depending upon the successfully verified boot chain. At each stage in the boot process, decisions may be made based on the assessed integrity of part or whole of the underlying platform that has been integrity-checked at that time (or by that time) and the policy that is to be applied. These policies may adapt or be replaced by new policies depending on the achieved trust level. The execution environment may change depending on the controlling policy at each boot stage. Subsequent stages and policies may use information passed from previous stages through available secured means of information conveyance or storage that transcends the execution stages (states, variable, parameters, registers, files, etc.). PIPE policies may be provisioned by one or more stakeholders. As examples, one stakeholder may have access to each of the policies, each stakeholder may have access to some of the policies (e.g., depending on priority level or association with a specific function), etc. As another example, a manufacturer may control low-level code policies, an operator may control software and configuration policies, and an application service provider may control higher level functional modules.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method to perform integrity validation of a network device, the method comprising:
receiving a first code integrity measurement of a first code stored in a memory of the network device;
generating a first key based on (1) a root key stored in a secure memory of the network device and (2) the first code integrity measurement, wherein the first key is valid when the first code integrity measurement is valid, wherein the first key relates to a first stage of trust associated with a first function of the network device, and wherein a valid first key is capable of being used by a first stakeholder to access the first function;
receiving a second code integrity measurement of a second code stored in the memory of the network device;
generating a second key based on (1) the first key and (2) the second code integrity measurement, wherein the second key is valid when the first code integrity measurement is valid and the second code integrity measurement is valid, wherein the second key relates to a second stage of trust associated with a second function, and wherein a valid second key is capable of being used by a second stakeholder to access the second function;
receiving a first nonce from the first stakeholder and a second nonce from the second stakeholder; and
sending a first signed message to the first stakeholder in response to the first nonce and a second signed message to the second stakeholder in response to the second nonce, wherein each of the first and second signed messages indicates an untrustworthy state, a partial trustworthy state, or a trustworthy state.

2. The method of claim 1, further comprising preventing access to the first function when the first code integrity measurement is invalid.

3. The method of claim 1, further comprising preventing access to the second function when the second code integrity measurement is invalid.

4. The method of claim 1, further comprising providing a last valid credential when the partial trustworthy state is indicated, wherein the last valid credential includes a last valid key associated with a last valid code integrity measurement.

5. The method of claim 1, wherein the first signed message further indicates a freshness of a first boot state and the second signed message further indicates a freshness of a second boot state, and wherein each of the first and second nonce is derived locally via at least one of a sequence counter or a date and time stamp function.

6. The method of claim 1, wherein the root key is stored in the secure memory at a time of manufacture or a time of provisioning.

7. The method of claim 1, wherein the secure memory is part of a secure hardware module and wherein the root key is not visible to software outside of the secure hardware module.

8. A network device, the network device comprising:
a secure hardware module for validating the integrity of a network device comprising a processor, wherein the secure hardware module:
receives a first code integrity measurement of first code stored in a memory of the network device;
generates a first key based on (1) a root key stored in a secure memory of the network device and (2) the first code integrity measurement, wherein the first key is valid when the first code integrity measurement is valid, and wherein the first key relates to a first stage of trust associated with a first function of the network device, and wherein a valid first key is capable of being used by a first stakeholder to access the first function;
receives a second code integrity measurement of a second code stored in the memory of the network device;
provides a second key based on (1) the first key and (2) the second code integrity measurement, wherein the second key is valid when the second code integrity measurement is valid, wherein the second key relates to a second stage of trust associated with a second function, and wherein a valid second key is capable of being used by a second stakeholder to access the second function;
receives a first nonce from the first stakeholder and a second nonce from the second stakeholder; and
sends a first signed message to the first stakeholder in response to the first nonce and a second signed message to the second stakeholder in response to the second nonce, wherein each of the first and second signed messages indicates an untrustworthy state, a partial trustworthy state, or a trustworthy state.

9. The network device of claim 8, wherein the secure hardware module is further configured to prevent access to the first function when the first code integrity measurement is invalid.

10. The network device of claim 8, wherein the secure hardware module is further configured to prevent access to the second function when the second code integrity measurement is invalid.

11. The network device of claim 8, wherein the secure hardware module is further configured to provide a last valid credential when the partial trustworthy state is indicated, and wherein the last valid credential includes a last valid key associated with a last valid code integrity measurement.

12. The network device of claim 8, wherein the first signed message further indicates a freshness of a first boot state and the second signed message further indicates a freshness of a second boot state, and wherein each of the first and second nonce is derived locally via at least one of a sequence counter or a date and time stamp function.

13. The network device of claim 8, wherein the root key is stored in the secure memory at a time of manufacture or a time of provisioning.

14. The network device of claim 8, wherein the secure memory is part of the secure hardware module, and wherein the root key is not visible to software outside of the secure hardware module.

* * * * *